US010485335B1

(12) United States Patent
Johnson et al.

(10) Patent No.: US 10,485,335 B1
(45) Date of Patent: Nov. 26, 2019

(54) WORKSTATION LIFT AND TILT ASSEMBLY

(71) Applicants: Simon Nicholas Johnson, Rowlett, TX (US); Michael John Sears, Dallas, TX (US)

(72) Inventors: Simon Nicholas Johnson, Rowlett, TX (US); Michael John Sears, Dallas, TX (US)

(73) Assignee: ERGOTECT CORPORATION, Dallas, TX (US)

( * ) Notice: Subject to any disclaimer, the term of this patent is extended or adjusted under 35 U.S.C. 154(b) by 0 days.

(21) Appl. No.: 15/813,047

(22) Filed: Nov. 14, 2017

(51) Int. Cl.
| | |
|---|---|
| A47B 21/02 | (2006.01) |
| A47B 21/04 | (2006.01) |
| F16M 11/04 | (2006.01) |
| F16M 11/10 | (2006.01) |
| A47B 9/20 | (2006.01) |
| A47B 9/10 | (2006.01) |
| A47B 9/00 | (2006.01) |
| A47B 21/03 | (2006.01) |

(52) U.S. Cl.
CPC ............ *A47B 21/02* (2013.01); *A47B 9/10* (2013.01); *A47B 9/20* (2013.01); *A47B 21/04* (2013.01); *F16M 11/046* (2013.01); *F16M 11/10* (2013.01); *A47B 2009/003* (2013.01); *A47B 2021/0364* (2013.01); *A47B 2200/0042* (2013.01); *A47B 2200/0046* (2013.01)

(58) Field of Classification Search
CPC .. A47B 9/10; A47B 9/20; A47B 21/02; A47B 21/04; A47B 2200/0042; A47B 2200/0046; A47B 2009/003; A47B 2021/0364; F16M 11/046; F16M 11/10; F16M 11/24; F16M 11/2014; F16M 11/2092; F16M 11/38
USPC ........... 248/917; 312/223.3, 208.1, 306, 312, 312/194–196; 108/93, 96, 43, 138, 50.01, 108/50.02, 14, 13, 11, 4, 9, 10, 33, 39
See application file for complete search history.

(56) References Cited

U.S. PATENT DOCUMENTS

| | | | |
|---|---|---|---|
| 5,690,310 A * | 11/1997 | Brown | A47B 23/043 248/444.1 |
| 6,736,469 B2 * | 5/2004 | Long | A47B 21/00 108/1 |
| 8,181,920 B2 * | 5/2012 | Brown | G06Q 99/00 108/50.01 |

(Continued)

*Primary Examiner* — Janet M Wilkens
(74) *Attorney, Agent, or Firm* — Law Office of Sam Sokhansanj PLLC

(57) ABSTRACT

A computer workstation lift and tilt assembly for providing a stable platform to raise, lower, and tilt various computing device. Here, the assembly can include a base, a first column, wherein the first column is secured to the base, and a second column. The assembly can further include a mount, wherein the mount is secured to a top region of the second column and configured to pivot relative to the second column, a first main slide having a first sub slide, and a second main slide having a second sub slide. Here, the first main slide can be secured to one side of the first column and the second main slide is secured to an opposing side of the first column, wherein the first sub slide is secured to one side of the second column and the second sub slide is secured to an opposing side of the second column, and wherein the second column is adapted slide relative to the first column.

20 Claims, 37 Drawing Sheets

(56) References Cited

U.S. PATENT DOCUMENTS

| | | | |
|---|---|---|---|
| 2004/0118984 A1* | 6/2004 | Kim | F16C 11/0619 248/149 |
| 2004/0188573 A1* | 9/2004 | Weatherly | A47B 81/061 248/125.1 |
| 2005/0205728 A1* | 9/2005 | Avery | A45F 5/00 248/149 |
| 2006/0219849 A1* | 10/2006 | Chiu | F16M 11/105 248/125.8 |
| 2010/0096515 A1* | 4/2010 | Hazzard | F16M 11/10 248/121 |
| 2013/0126682 A1* | 5/2013 | Tholkes | F16M 11/046 248/125.8 |
| 2013/0233984 A1* | 9/2013 | Huang | F16M 11/046 248/162.1 |
| 2015/0159804 A1* | 6/2015 | Bowman | F16M 11/045 248/122.1 |
| 2016/0073779 A1* | 3/2016 | Ringlein | A47B 87/002 108/28 |
| 2017/0013957 A1* | 1/2017 | McRorie, III | A47B 21/02 |

* cited by examiner

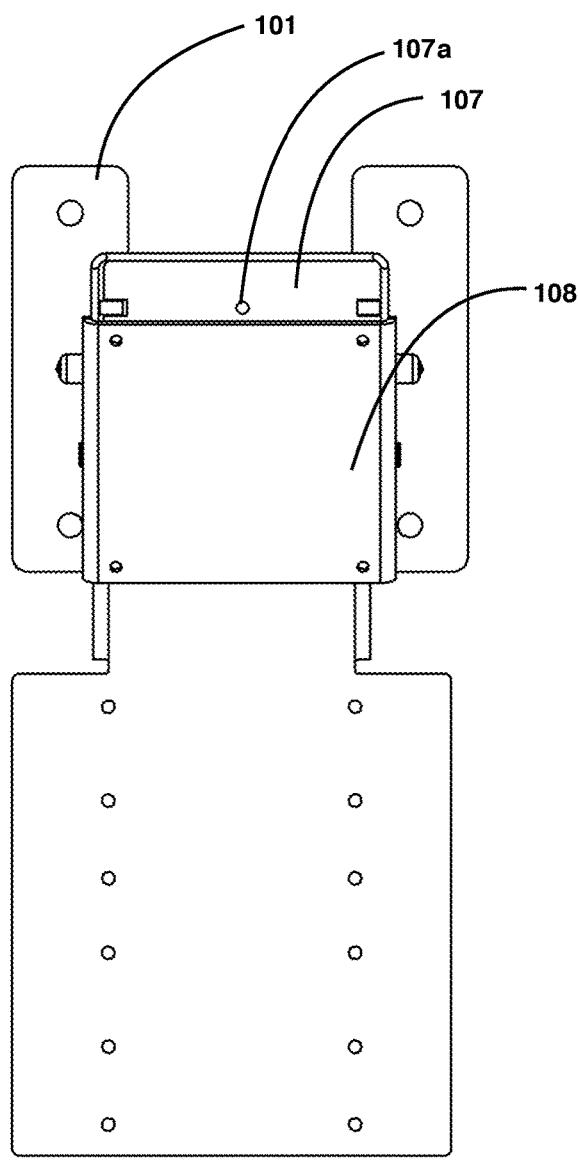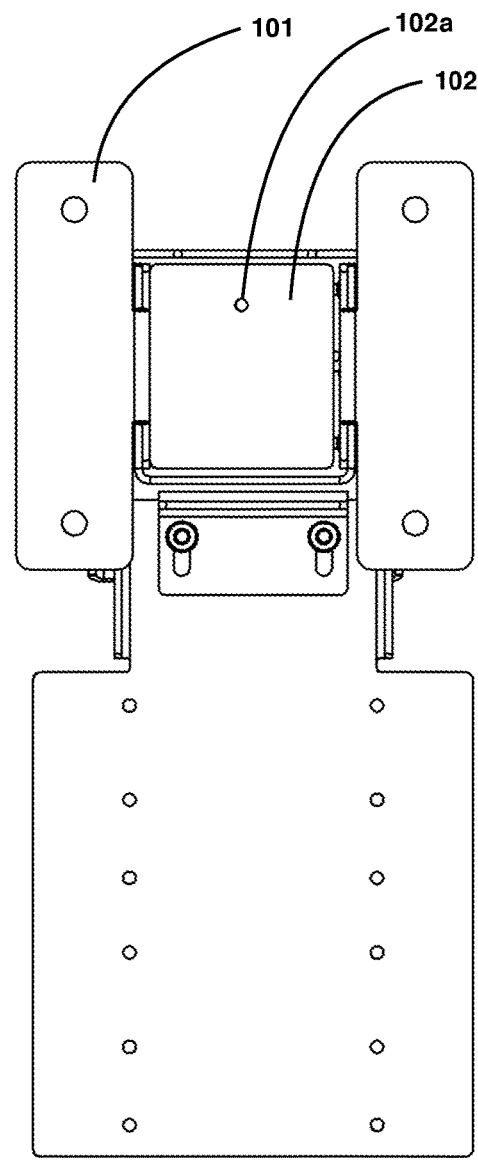
FIG. 2A  FIG. 2B

WORKSTATION LIFT AND TILT ASSEMBLY

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Workstation mounting assemblies adapted to support computer monitors or computer keyboards encompass a wide variety of designs that are adapted to be used in various work settings. Many of these designs are specifically adapted to be used within a specific work environment. For example, one such work environment can be for the retail merchandise industry, inventory management, or business to consumer environments, such as in in-store retail stores, grocery stores, pharmacies, hotels, or warehouse environments. Generally, conventional wall-mounted or desk mounted workstation assemblies have been typically large in design and cumbersome to use, particularly when a user is standing up. Moreover, these units do not provide adequate horizontal and vertical adjustability to the users, such as standing users, to allow easy and quick access to computer peripherals, such as the keyboard, mouse, or display monitor. In particular, this is more evident in situations where a workstation is located behind a counter, wherein a merchant user is standing up and facing a customer. In such a situation, it is undesirable to have a display screen at least partially blocking the merchant's view to the customer.

Hence, what is needed is a simple desk or floor mounted workstations that is not only vertically adjustable but also horizontally adjustable, and tiltabley adjustable, wherein a display monitor can be tilted to any desired orientation, such as in situations wherein user is standing up and looking down on the display monitor.

SUMMARY

In one aspect of the disclosure described herein, a computer workstation lift and tilt assembly for providing a stable platform to raise, lower, and tilt various computing device. Here, the assembly can include a base, a first column, wherein the first column is secured to the base, and a second column. The assembly can further include a mount, wherein the mount is secured to a top region of the second column and configured to pivot relative to the second column, a first main slide having a first sub slide, and a second main slide having a second sub slide. Here, the first main slide can be secured to one side of the first column and the second main slide is secured to an opposing side of the first column, wherein the first sub slide is secured to one side of the second column and the second sub slide is secured to an opposing side of the second column, and wherein the second column is adapted slide relative to the first column.

The computer workstation assembly can include the top region of the second column further having a first slot and a second slot, wherein the second slot is below the first slot. In addition, the second slot may have an arcuate configuration. Further, the second slot can receive a fastener or protrusion therein, and wherein the fastener or protrusion can slide within the arcuate configuration of the second slot. Here, the top region of the second column can also include a third slot, wherein the third slot is on an opposing side of the first slot or second slot. The computer workstation assembly may also include an elongated biasing mechanism, wherein the elongated biasing mechanism is comprised of a gas spring cylinder. Here, wherein one end of the biasing mechanism can be secured to a first plate near the top region of the second column and another end of the biasing mechanism can be secured to a second plate near the base. In addition, the computer workstation assembly may also include a support plate secured to the second column, wherein the support plate is configured to pivot relative to the first or second column. In the computer workstation assembly may also include a stop member, wherein the stop member is secured to the support plate. Here, the stop member can be configured to engage the first column, thereby preventing movement of the second column relative to the first column.

In another aspect of the disclosure described herein, a computer workstation assembly is disclosed having a first column and a second column, and an adapter, wherein the adapter is secured to a distal region of the second column and configured to pivot relative to the second column. The workstation assembly may also include a first slide receiver having a first extendable slide, and a second slide receiver having a second extendable slide, wherein the first slide receiver is secured to one side of the first column and the second slide receiver is secured to an opposing side of the first column. The workstation assembly may also include the first extendable slide being secured to one side of the second column and the second extendable slide being secured to an opposing side of the second column, and wherein the second column is adapted slide relative to the first column. In addition, the computer workstation assembly may also include a peripheral support plate secured to the second column, and a flange having a stop member secured to the peripheral support plate. Here, the stop member can have a rubberized pad, wherein the stop member is configured to engage to or disengage from a front exterior region of the first column. In addition, the assembly may also include the adapter having at least one protruding member that is received within a channel or groove of second column.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 2A illustrates a top view of the workstation lift and tilt assembly shown in FIG. 1A.

FIG. 2B illustrates a bottom view of the workstation lift and tilt assembly shown in FIG. 1A.

DETAILED DESCRIPTION

Figure 1A:
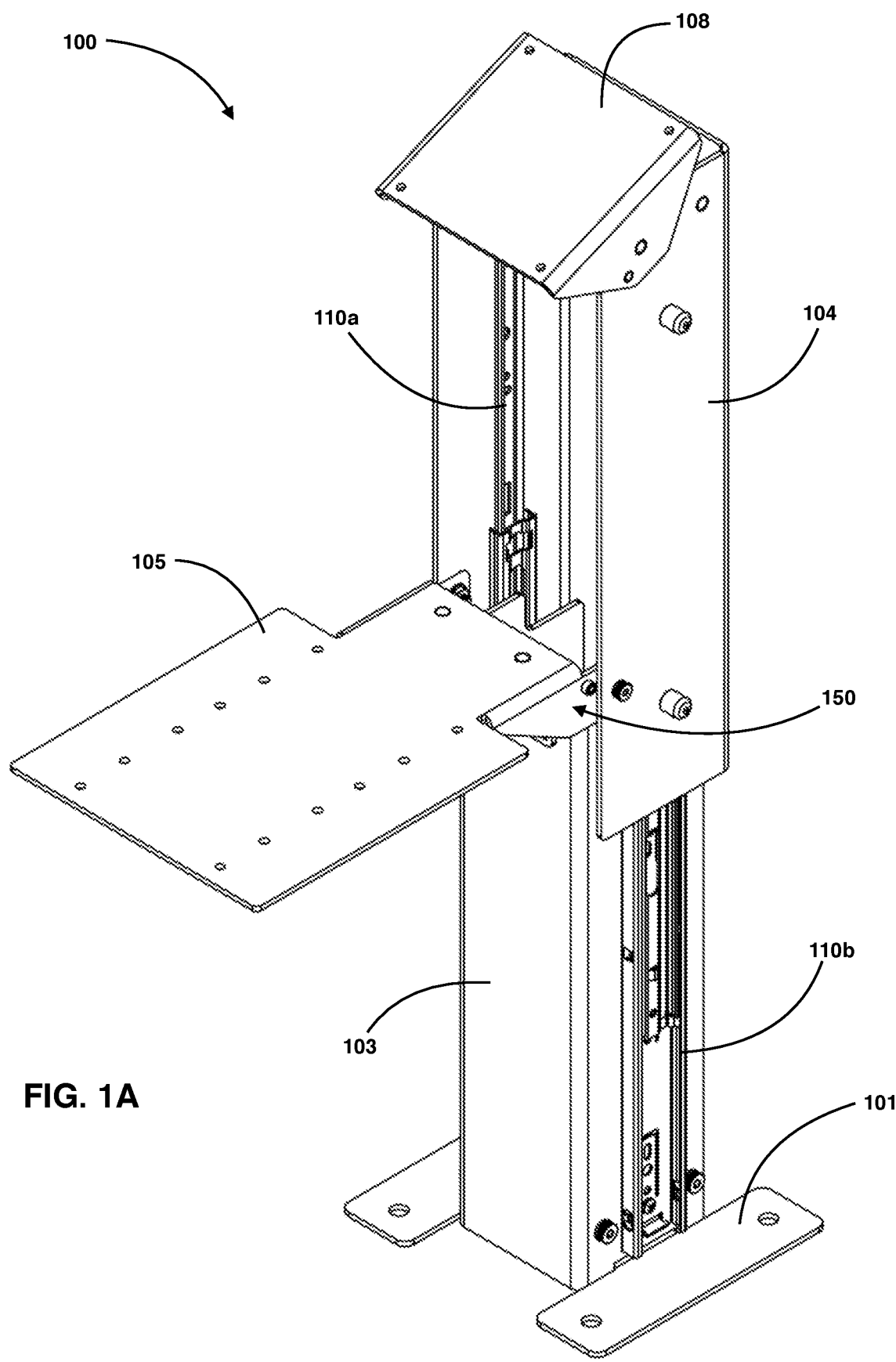
FIG. 1A illustrates a front perspective view of one non-limiting embodiment of a workstation vertical lift and tilt assembly of the disclosure described herein.
Figure 1B:
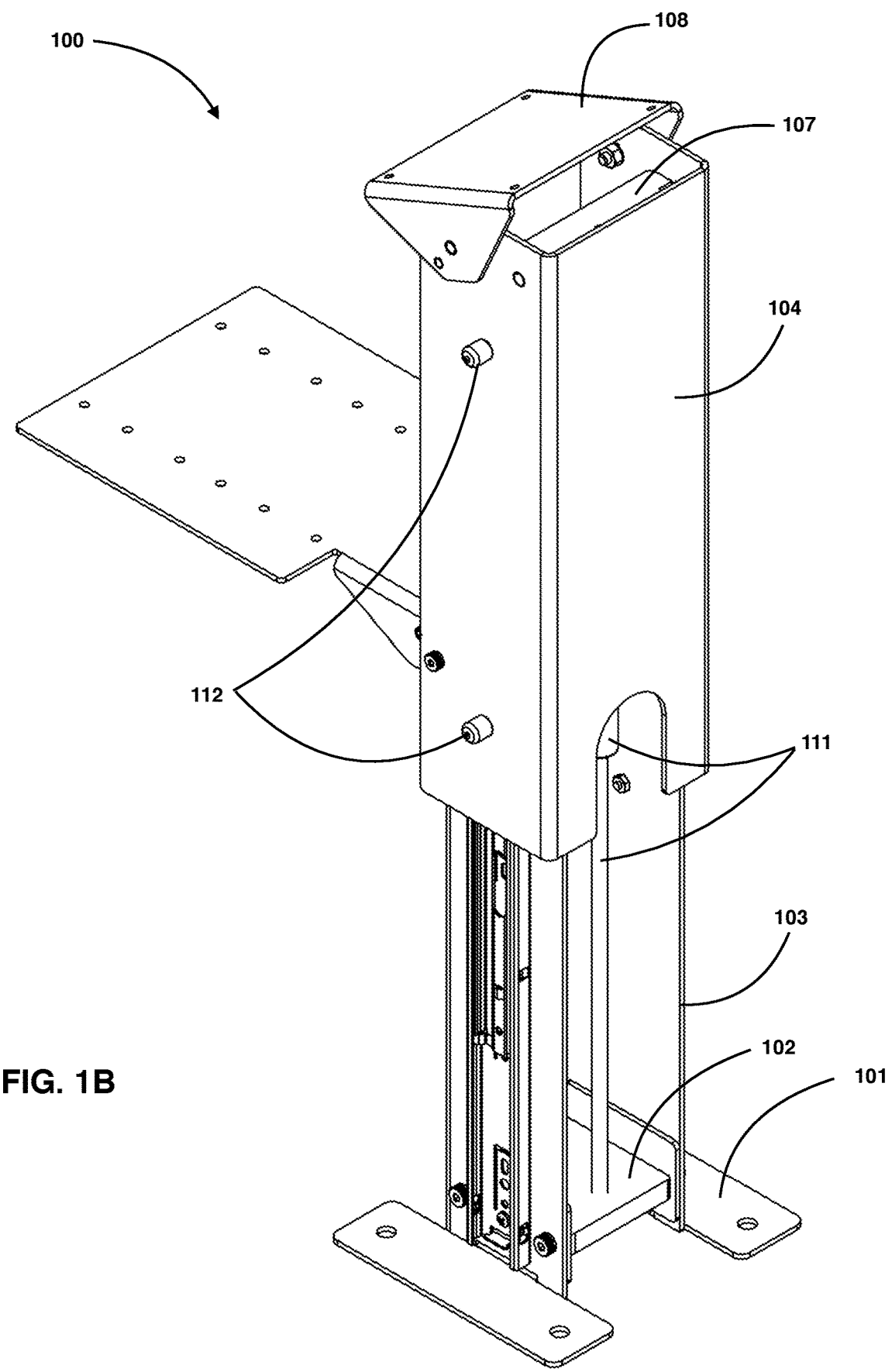
FIG. 1B illustrates a rear perspective view of the workstation lift and tilt assembly shown in FIG. 1A.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

FIGS. 1A-5B illustrates one non-limiting embodiment of the computer workstation lifting and tilting assembly of the disclosure described herein. Here, the computer workstation lifting and tilting assembly 100 may include a base 101 comprised of a pair of flanged mounts or brackets, that are further secured to both bottom support block 102 and also column 103 via one or more fasteners. It is contemplated within the scope of the disclosure described herein that base 101 may be mounted and affixed to either a desk, countertop, floor, or the ground, among other areas, as also shown in FIGS. 11A-12C. Here, bottom support block 102 can further include an aperture for receiving and securing therein a first or lower end of a spring biasing mechanism or gas spring cylinder 111. Here, assembly 100 includes a first upright support column 103 that is further secured to base 101 via one or more fasteners 121 on each side thereof. The upright support column 103 can further include a pair of sliding extensions 110 on each side of column 103. More specifically, sliding extensions 110 can be fully extendable three-stage slides that telescope and slide relative to each other. For example, referring to FIG. 3A, slide 110 can include a first slide receiver 110a, a second extendable slide 110b, and a third extendable slide 110c, wherein the third slide 110c can slide and extend from within the second slide 110b, and the second slide 110b can slide and extend from within the first slide 110a, such that the second slide 110b and third slide 110c may nest within each other or the first slide 110a. Here, slide 110a can be fixed and secured to column 103. In addition, either second slide 110b or third slide 110c can be secured to column 104. Here, the full range of slide 110 can be from 6 inches up to and including 72 inches, among other extendable ranges.

Still referring to FIGS. 1-5B, a portion of slide 110, such as its second or third slide, can be secured to the interior wall of the second upright column 104, such that column 104 may slide vertically up or or down relative to column 103. In addition, second upright column 104 may include a top support block 107 secured thereto. Here, top support block 107 may include an aperture for receiving and securing a second upper end of the gas spring cylinder 111, such that gas spring cylinder 111 provides a biasing or counter-biasing mechanism for the second upright column 104 relative to first upright column 103. More specifically, block 107 may be secured within column 104 via a pair of protrusions 107a on each side of column 104 that abut against and are received within a pair of notches or grooves 107b within block 107, such that block 107 is held in place via the upright compression force of gas cylinder 111. Accordingly, block 107 may be easily removed via the removal of gas cylinder 111. In addition, workstation assembly 100 can further include a tilting or pivotable display monitor adapter head or mount 108 secured to the upper or distal region of the second upright column 104, wherein head 108 can also have an elongated configuration, such as head 109 shown in FIG. 7E-7F. More specifically, mount 108 can be configured to tilt or pivot a display screen or display monitor 200 relative to columns 104 and 103, as shown in FIG. 3B, and which will later be described in more detail.

Still referring to FIGS. 1-5B, assembly 100 may also include a keyboard, work surface, or peripheral support plate 105 that may be further secured to second upright column 104 via fasteners 120, 122c, and 115, among others, such that support plate 105 may further pivot relative to columns 103 and 104, which will later be described in more detail. Workstation assembly 100 may also include one or more protrusions threaded pins, stubs, or stand-off components 112 (and corresponding lock nuts 113) on either side of support column 104 to support one or more optional accessories, such as articulating arms or other computing device holders or securement members. Further, second support column 104 may also include arc-like cut-away opening 104a to allow for cable management, such as routing one or more cables or wiring to through column 104. In addition, opening 104a may also provide access to the interior of columns 103 and 104 for repair or maintenance of assembly 100, such as for removing and replacing gas cylinder 111.

Figure 3A:
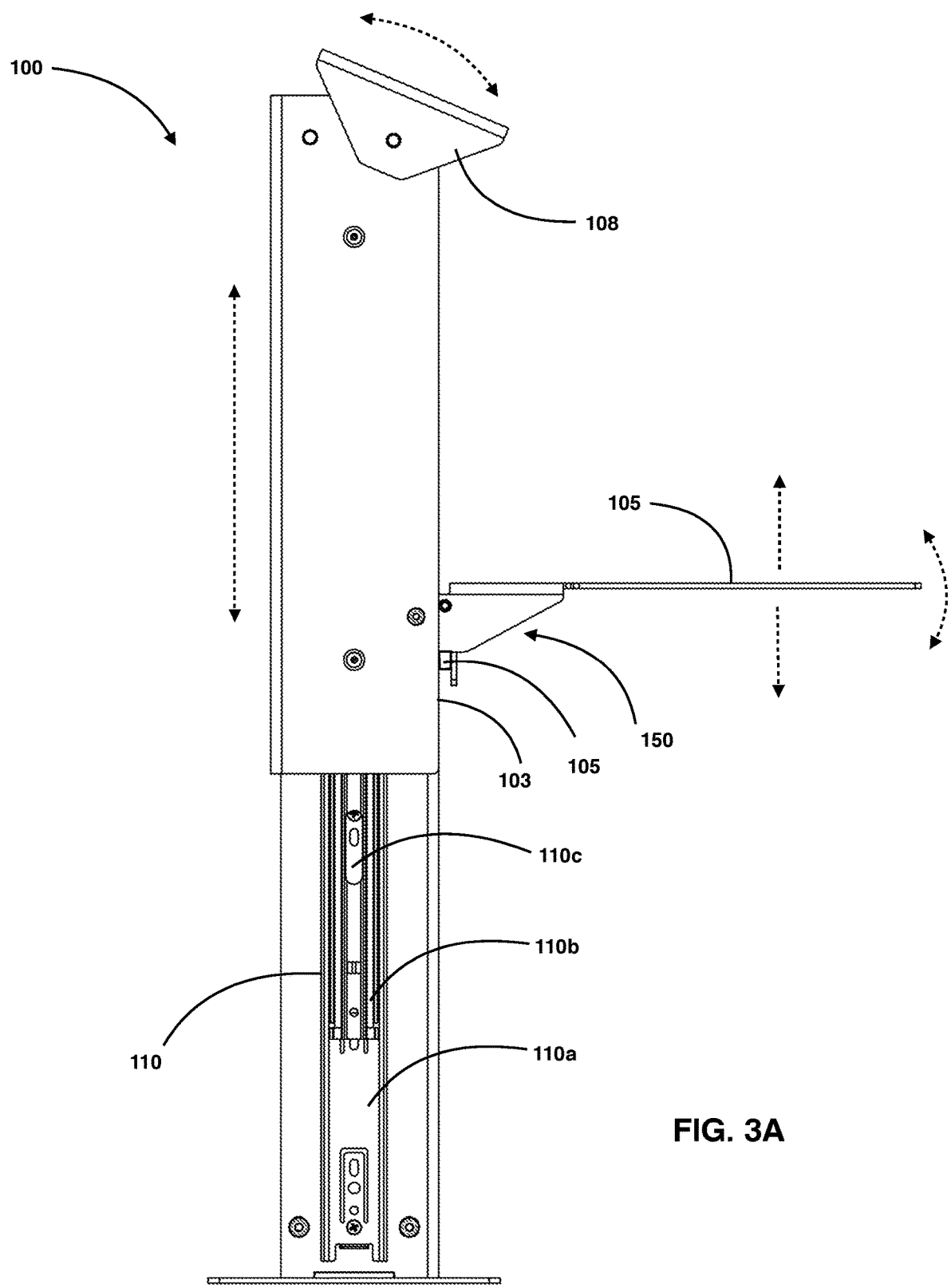
FIG. 3A illustrates a side view of the workstation lift and tilt assembly shown in FIG. 1A.
Figure 3B:
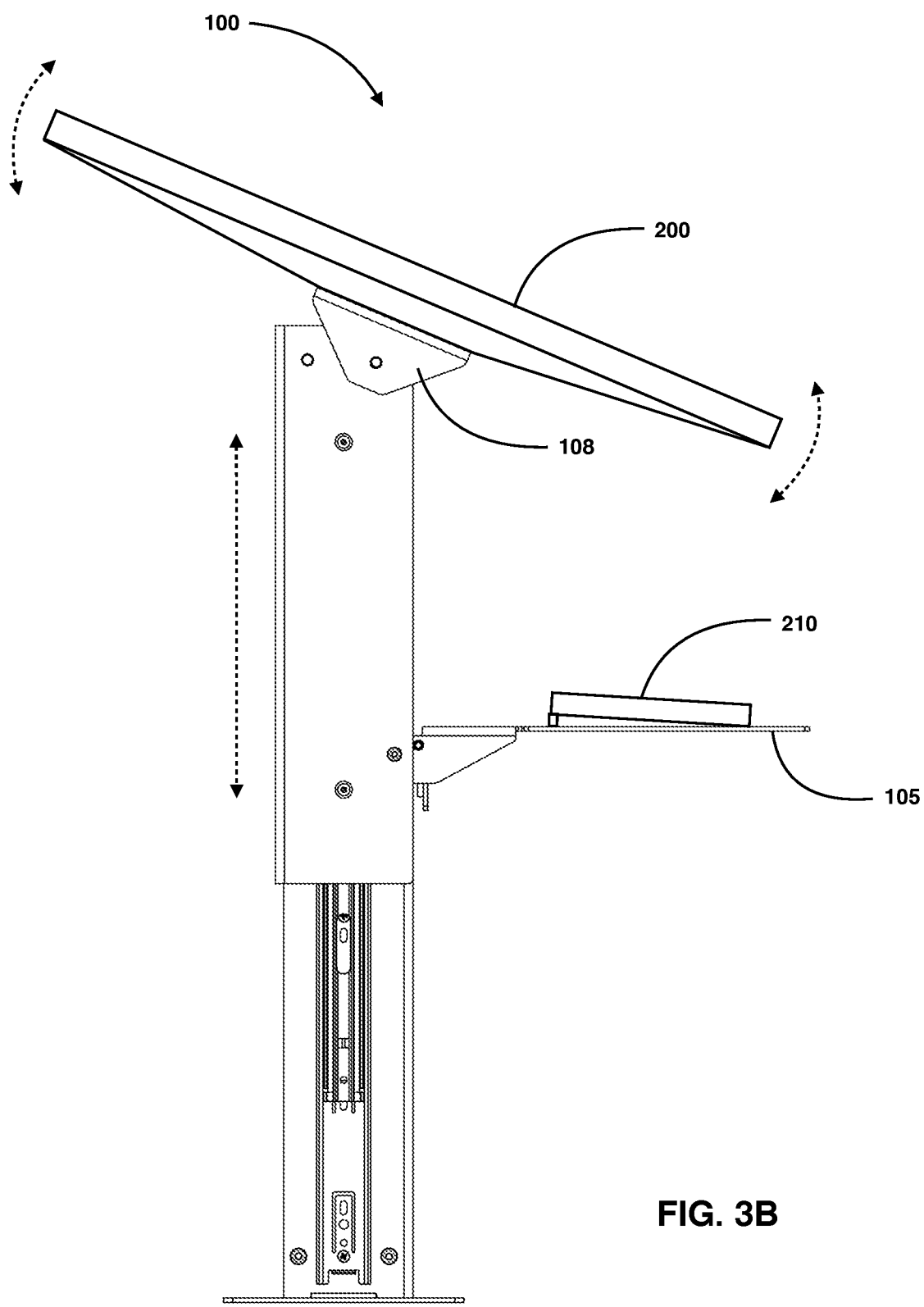
FIG. 3B illustrates another side view of the workstation lift and tilt assembly shown in FIG. 1A, shown with a screen display and a peripheral.
Figure 4A:
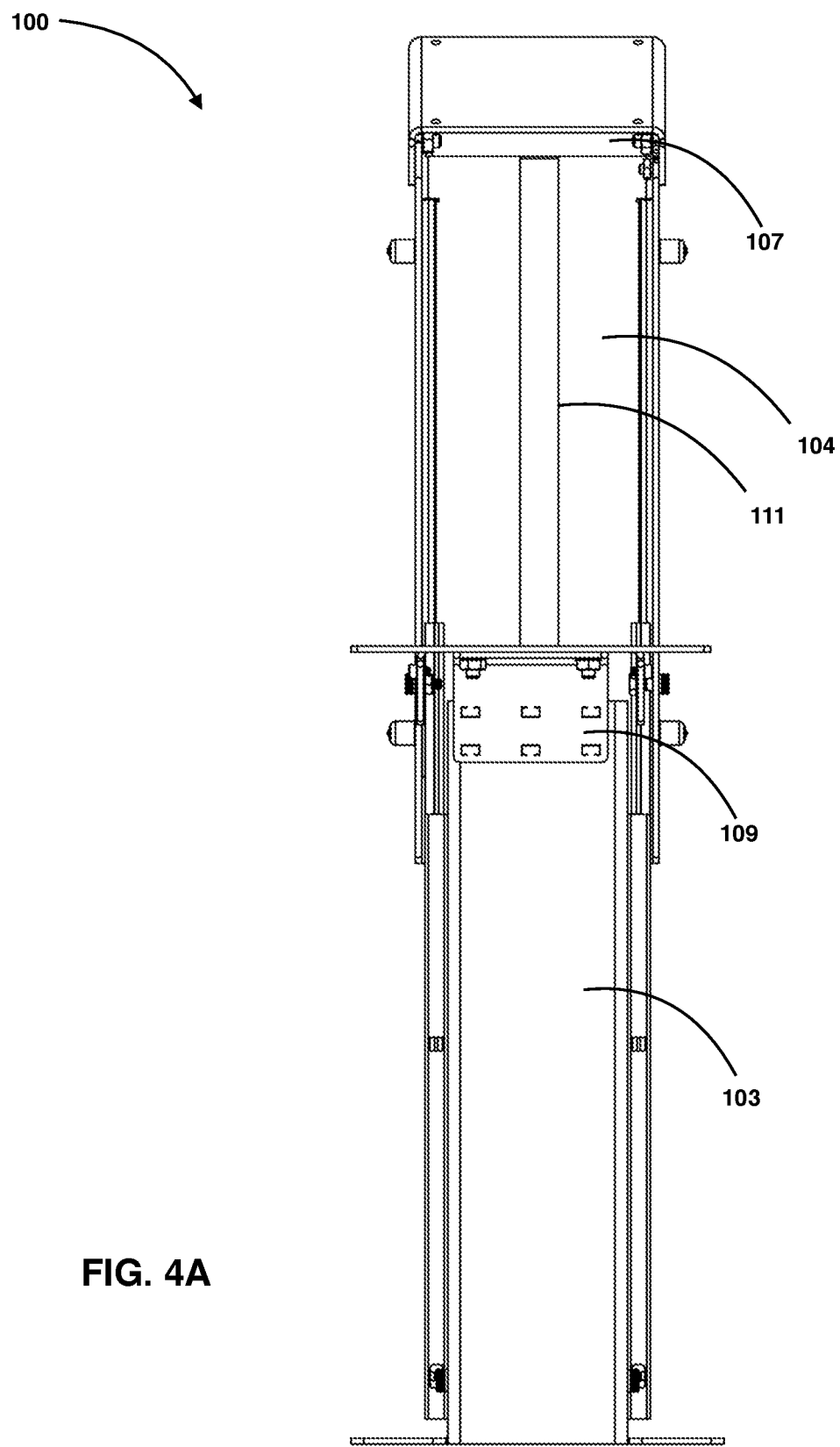
FIG. 4A illustrates a front view of the workstation lift and tilt assembly shown in FIG. 1A.
Figure 4B:
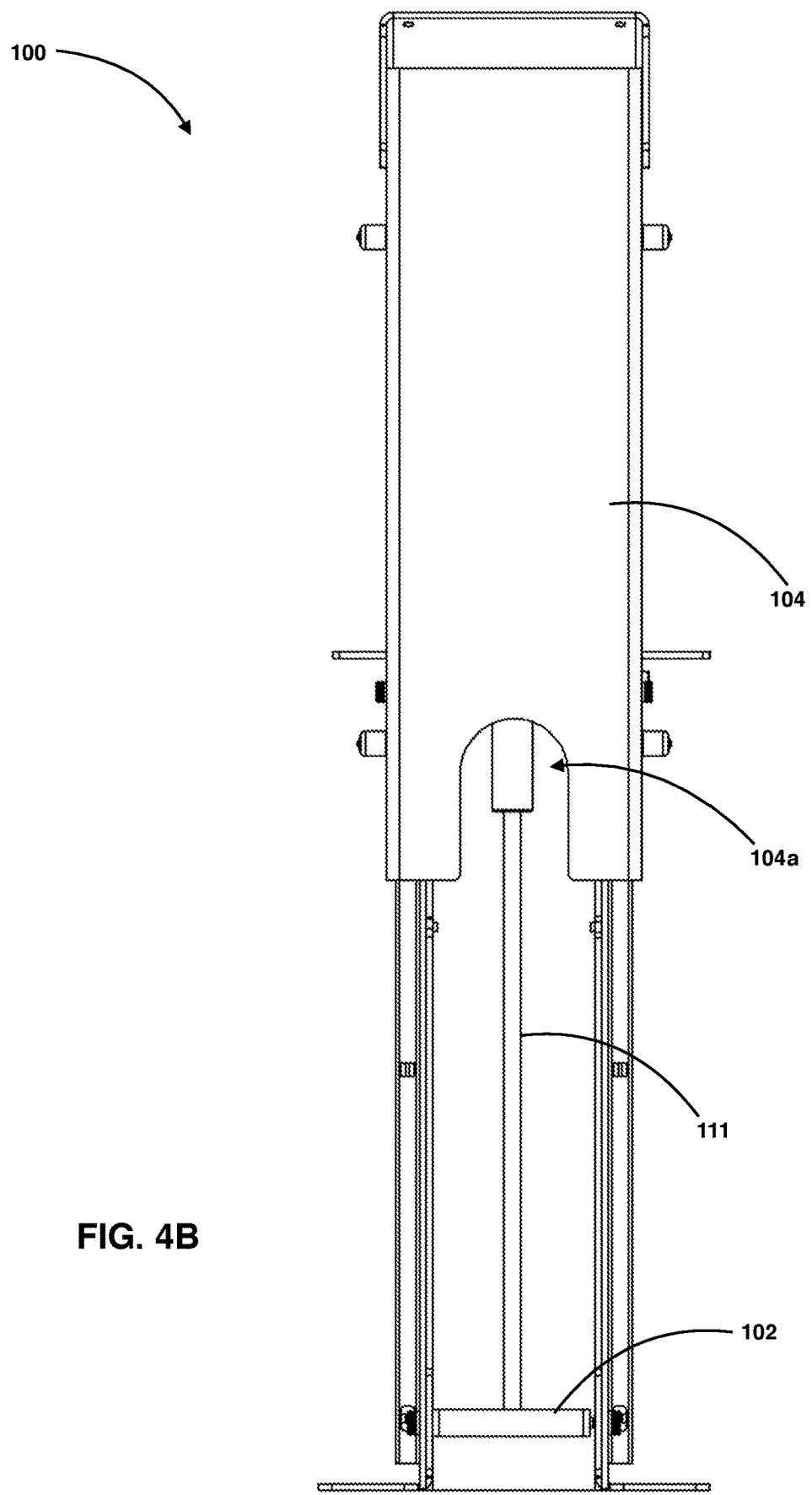
FIG. 4B illustrates a rear view of the workstation lift and tilt assembly shown in FIG. 1A.
Figure 5A:
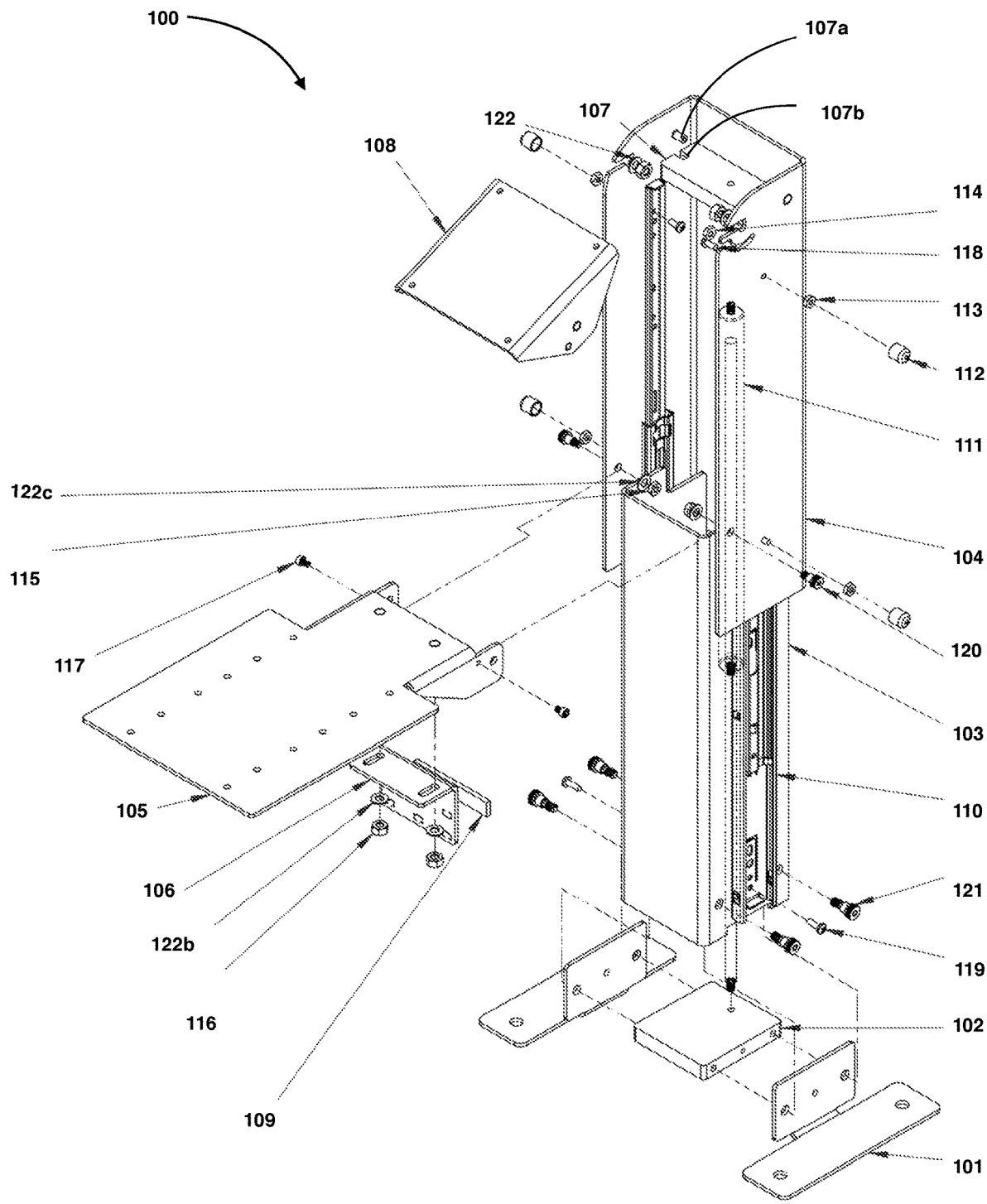
FIG. 5A illustrates an exploded front perspective view of the workstation lift and tilt assembly shown in FIG. 1A.
Figure 5B:
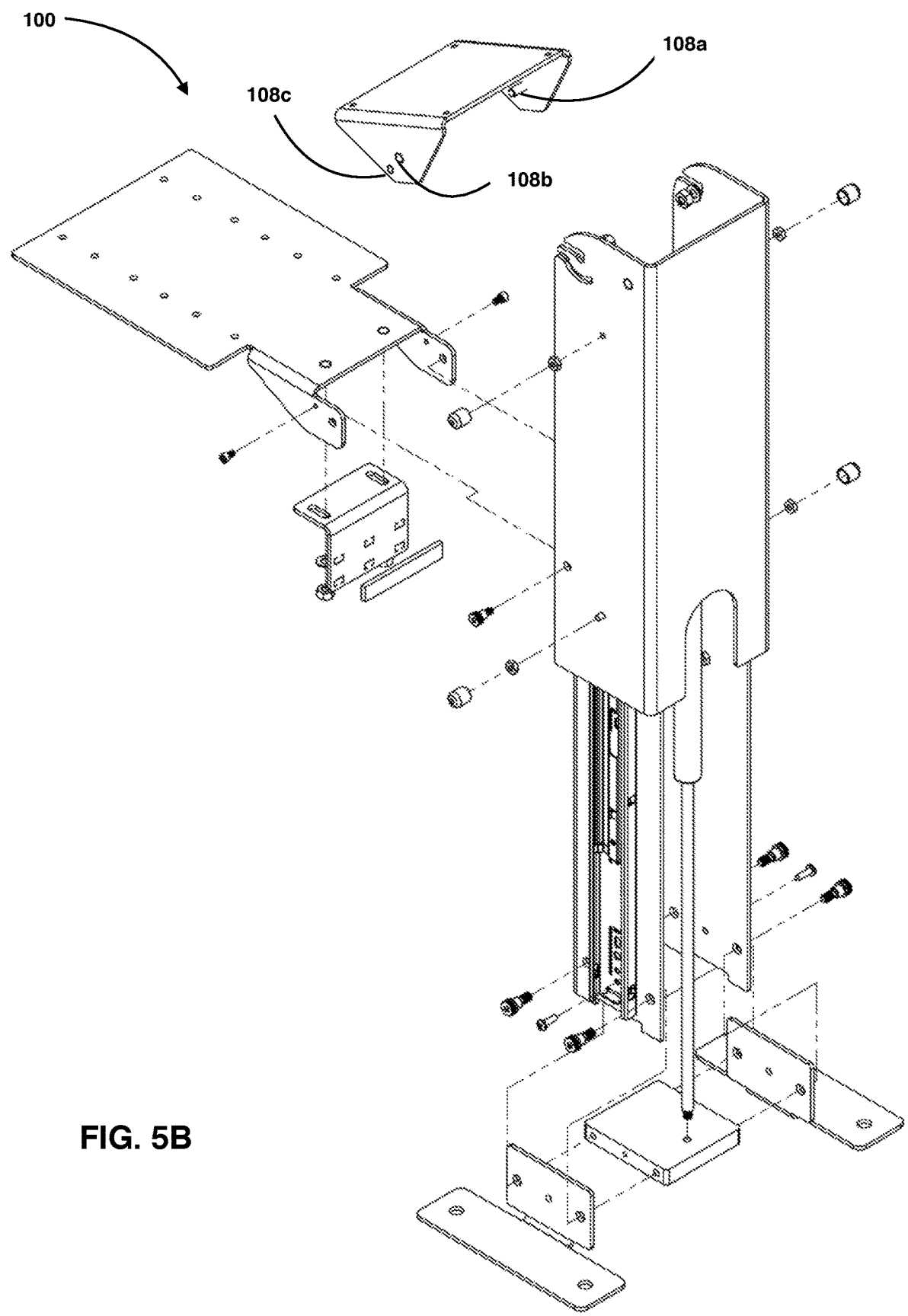
FIG. 5B illustrates an exploded rear perspective view of the workstation lift and tilt assembly shown in FIG. 1A.
Figure 6A:
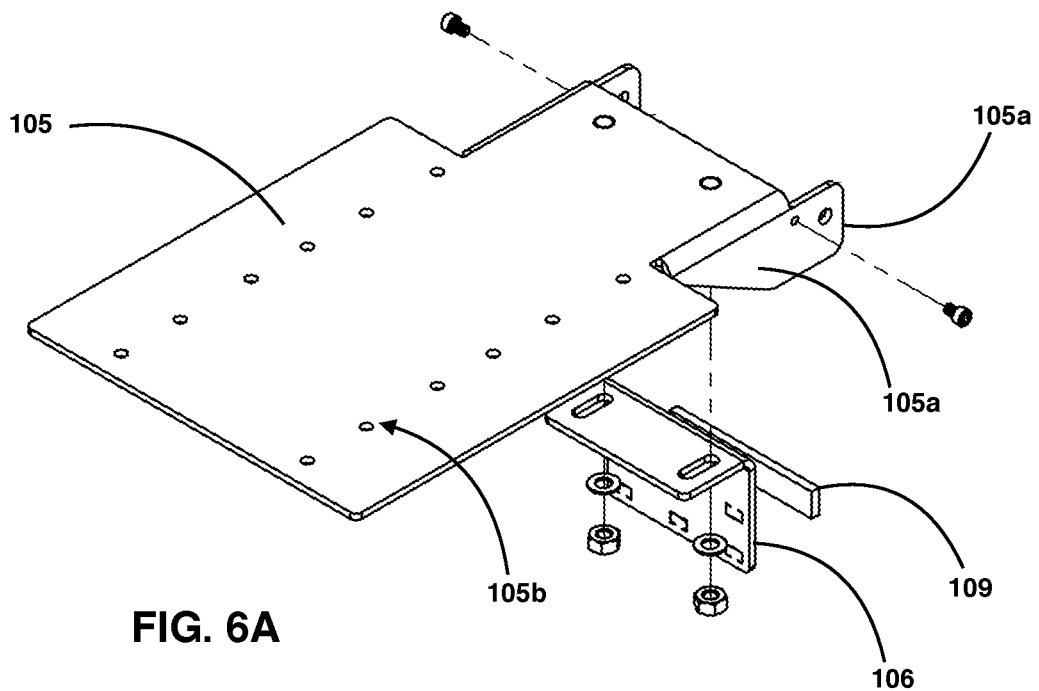
FIG. 6A illustrates a top perspective exploded view of a user input, or keyboard or work surface mount apparatus of the workstation lift and tilt assembly shown in FIG. 1A.
Figure 6B:
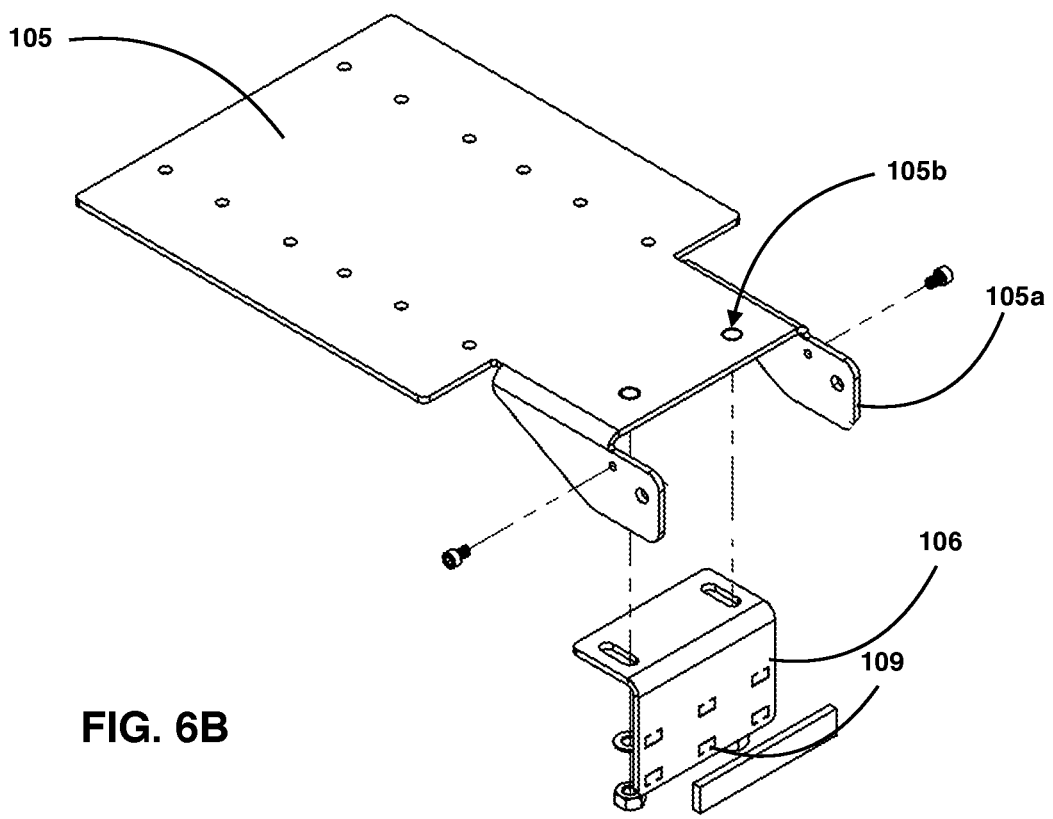
FIG. 6B illustrates a rear perspective exploded view of a user input or keyboard mount apparatus of the workstation lift and tilt assembly shown in FIG. 1A.
Figure 7A:
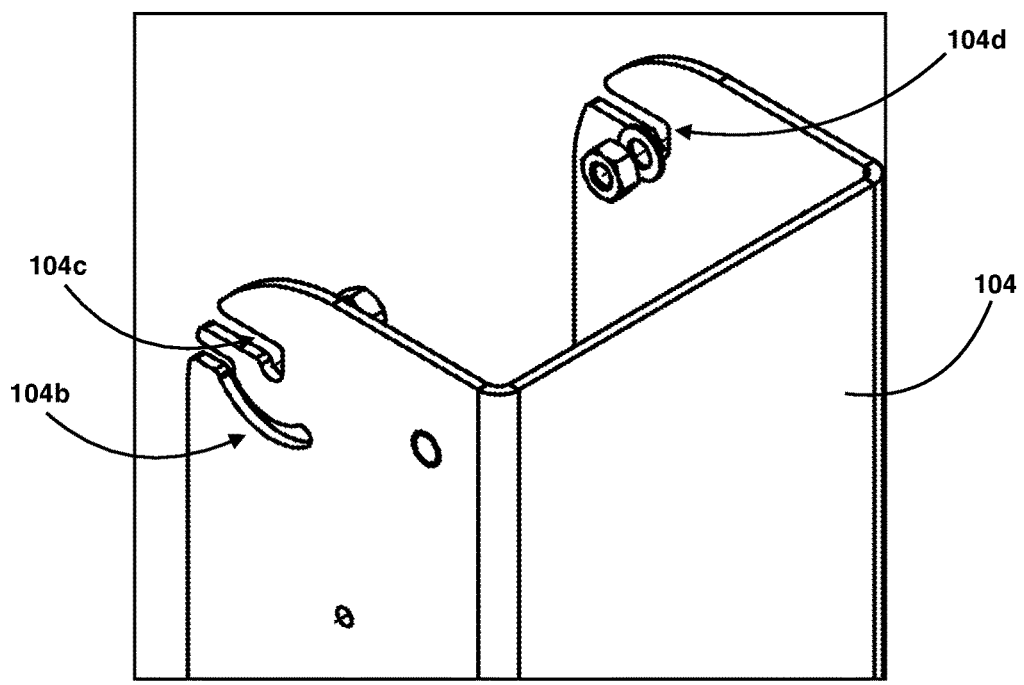
FIG. 7A illustrates a close-up exploded rear perspective view of a display bracket receiver of the workstation lift and tilt assembly of the disclosure described herein.
Figure 7B:
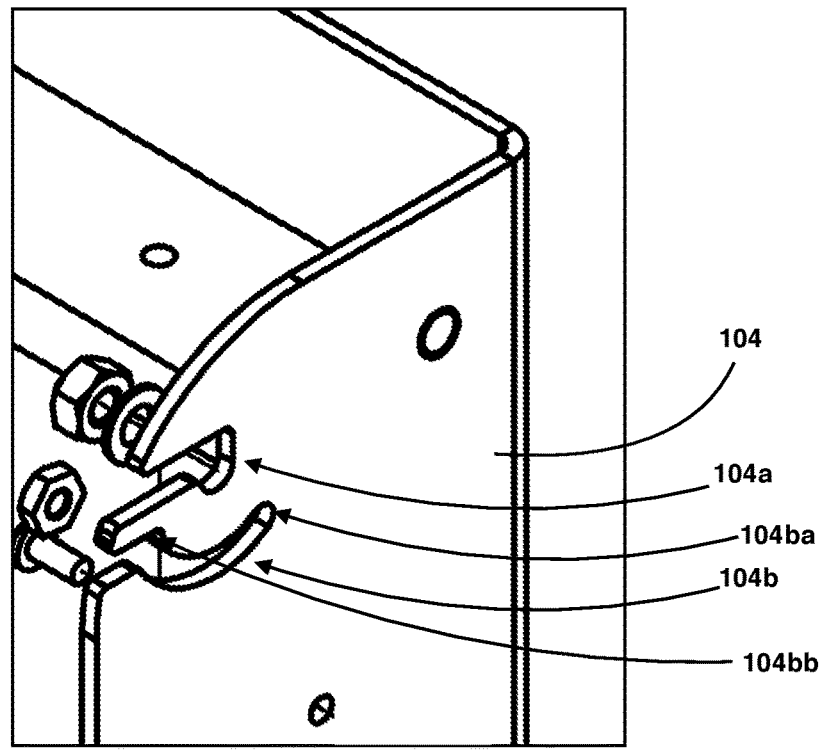
FIG. 7B illustrates a close-up exploded front side perspective view of a display bracket receiver of the workstation lift and tilt assembly of the disclosure described herein.
Figure 7C:
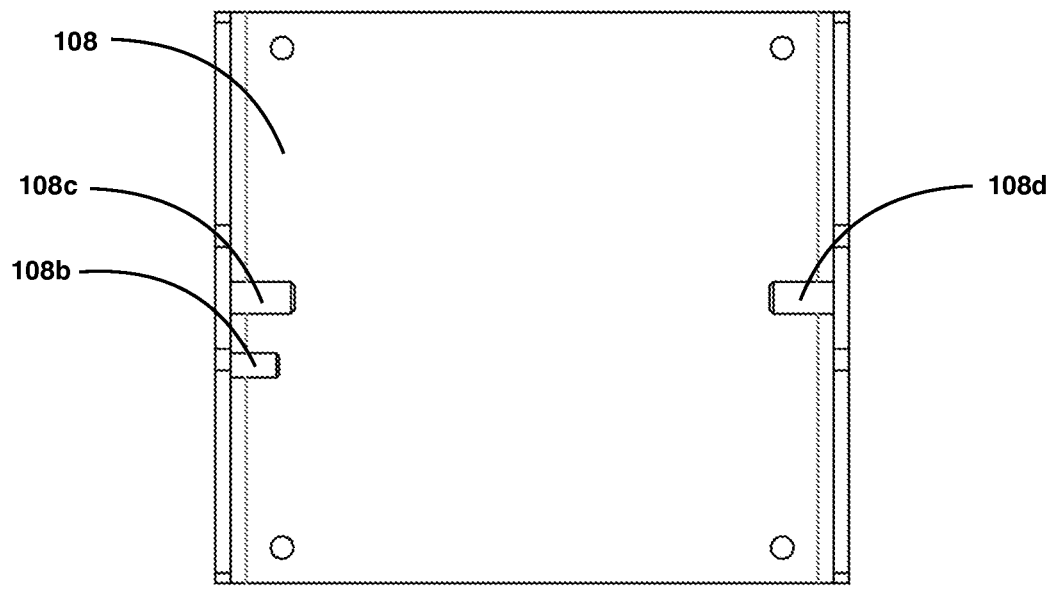
FIG. 7C illustrates an interior bottom view of the display bracket receiver of the workstation lift and tilt assembly of the disclosure described herein.
Figure 7D:
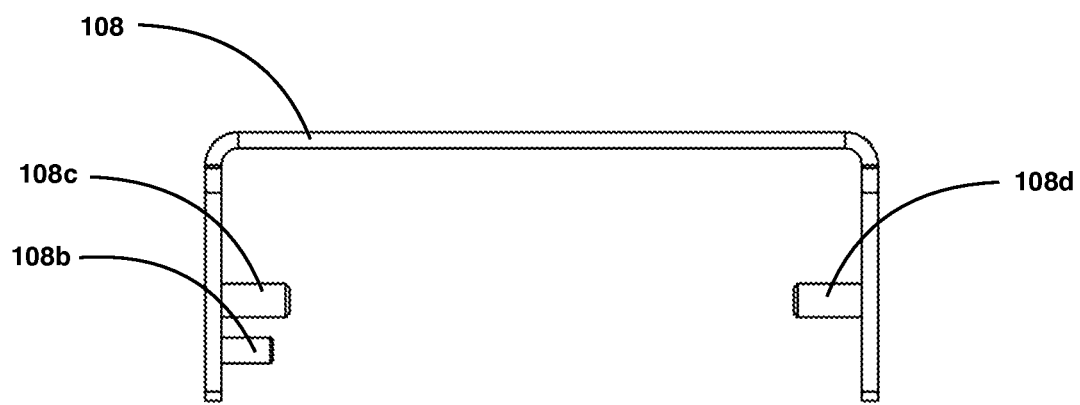
FIG. 7D illustrates a front view of the display bracket receiver of the workstation lift and tilt assembly of the disclosure described herein.
Figure 7E:
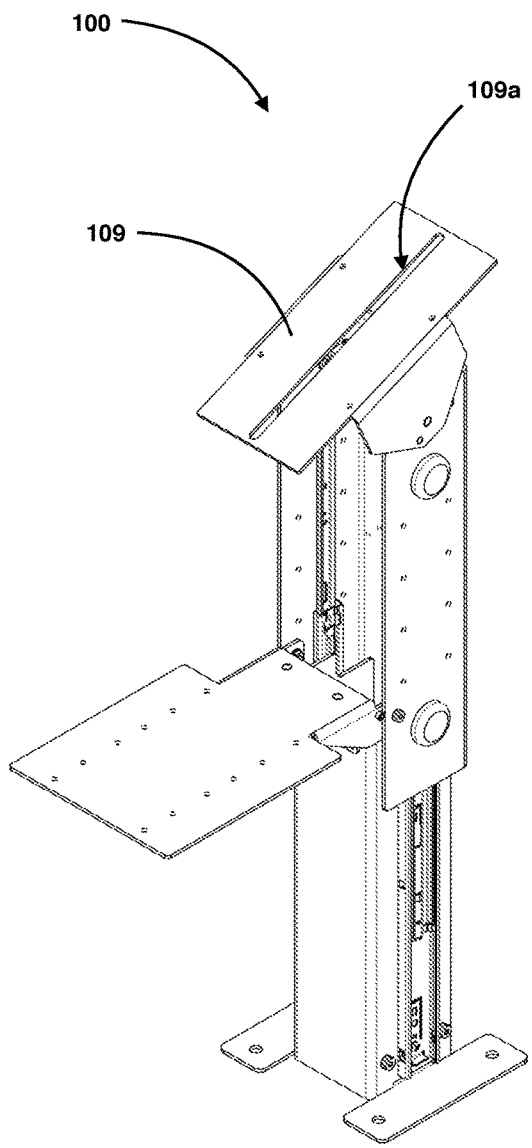
FIG. 7E illustrates a front perspective of the workstation lift and tilt assembly shown with with an elongated pivoting display bracket head in one non-limiting embodiment of the disclosure described herein, in an extended and raised position.
Figure 7F:
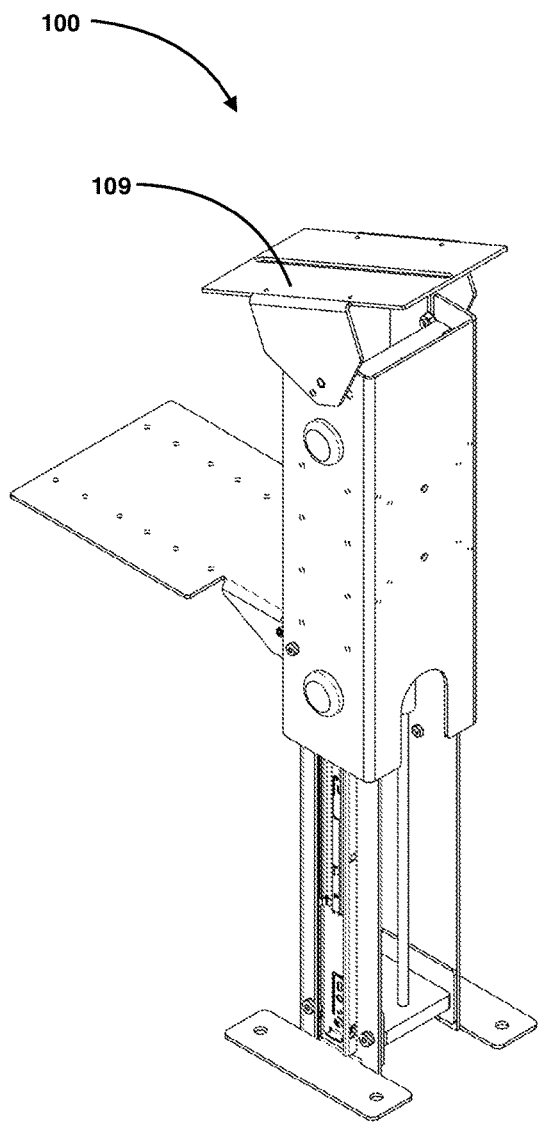
FIG. 7F illustrates a rear perspective view of the workstation lift and tilt assembly of FIG. 7E.
Figure 7G:
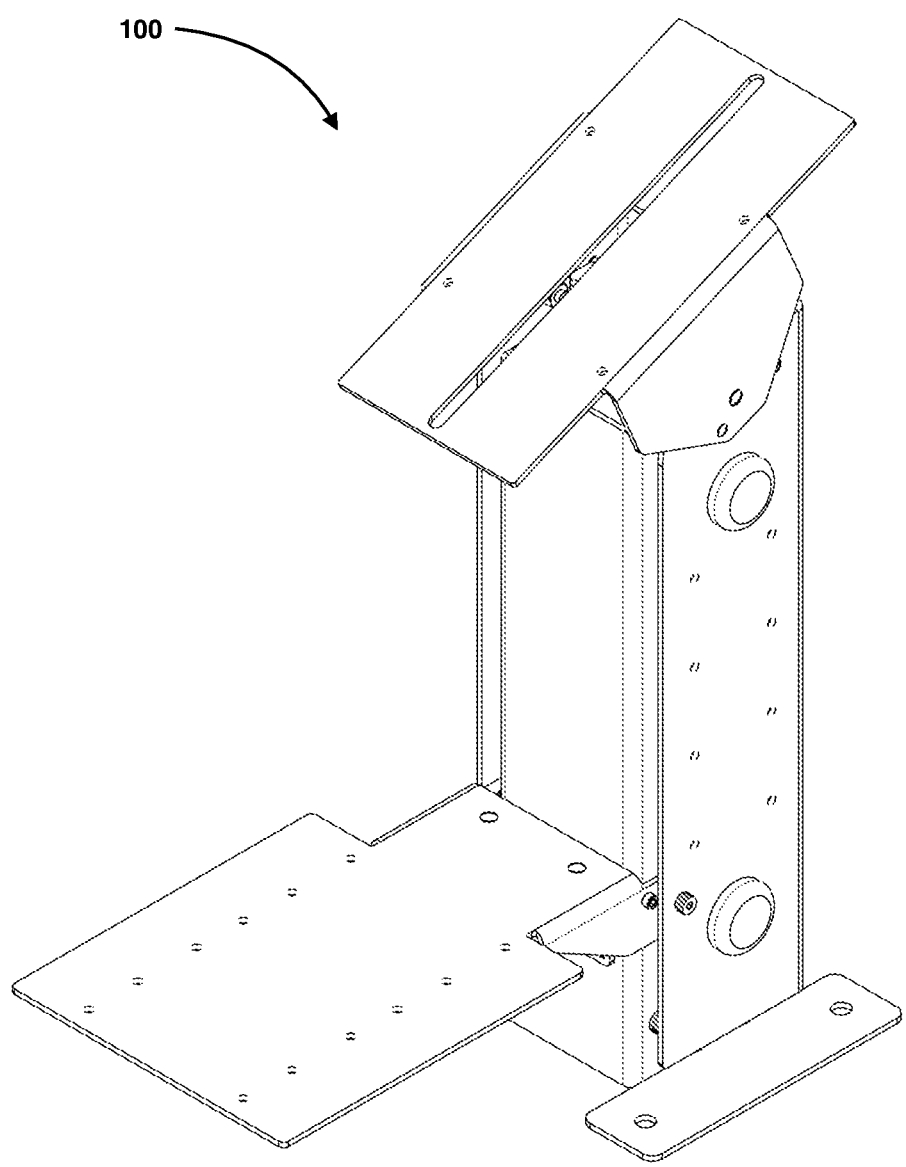
FIG. 7G illustrates a front perspective view of the workstation of FIG. 7E, shown in a lowered and stowed position.
Figure 7H:
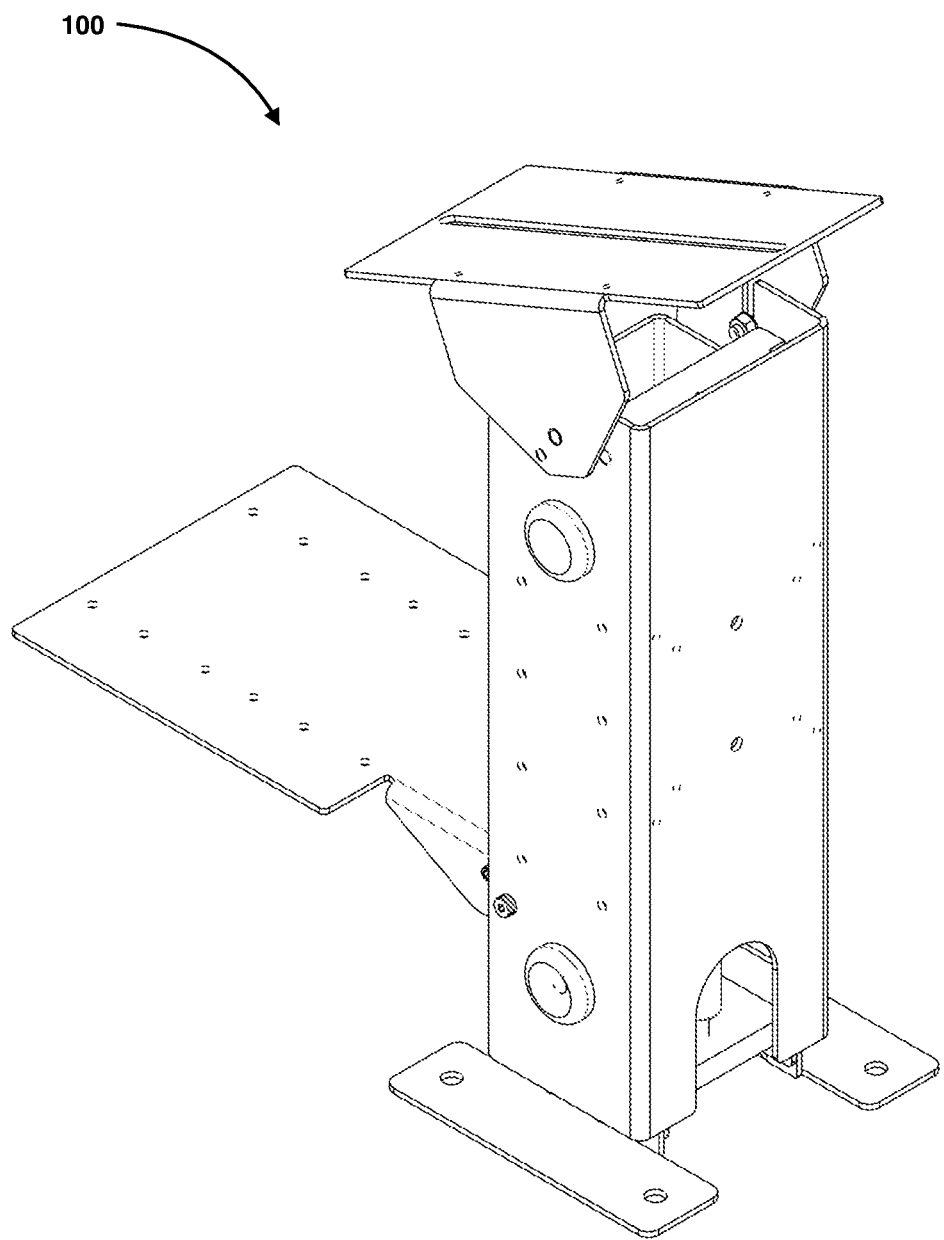
FIG. 7H illustrates a rear perspective view of the workstation of FIG. 7G, shown in a lowered and stowed position.

Referring now to FIGS. 3A-3B and 5A-6B, support plate 105 can generally include a pair of flanges 105a configured to be pivotally secured to second support column 104. In addition, a top surface region of plate 105 may include a plurality of apertures 105b for securing one or more trays, keyboard, user input devices, or peripheral support devices to plate 105 via one or more fasteners. FIG. 3B illustrates one embodiment of support plate 105 supporting a user input device 210, such as a keyboard. Further, support plate 105 may also include a braking or stop mechanism 106 that allows the second column 104 to engage and disengage from the first column 103. More specifically, stop 106 can be secured between flanges 105 and to the underneath surface of plate 105 via one or more fasteners and apertures 105b. Here, stop 106 can be further comprised of an L-shaped flange having an exterior face region that receives a rubberized friction material or pad 109, and wherein pad 109 is further configured to engage an exterior surface or wall of first column 103, as shown in FIG. 3A. Referring to FIG. 3A, by operation, when a user pivots or tilts support plate 105 (or any component or trey secured thereto), then stop 106 and corresponding pad 109 also tilt away from support column 103, thereby disengaging stop 106 and pad 109 and allowing support column 104 to freely move vertically up or down. Here, FIGS. 7G-7H illustrate one embodiment of apparatus 100 in a lowered position. More specifically, the counter biasing mechanism or gas spring cylinder 111 is configured at pre-defined load or pre-load compression setting, depending on the size and weight to be supported by assembly 100, such that it can allow for smooth and near effortless movement of support column 104 in the vertical up or down direction relative to support column 103.

Referring now to FIGS. 7A-7D, a close up upper region of column 104 is shown. More specifically, column 104 may include a pair of notches, slots, or grooves 104b and 104c on side and a another notch, slot, or groove 104d on an opposing side. Here, notches 104c and 104d are axially aligned with each other. More specifically, notches 104c and 104d receive a a pair of protruding fasteners 108c and 108d from bracket 108, wherein fasteners 108c and 108d pivotally secure bracket 108 to column 104, such that bracket 108 may tilt or pivot in any direction relative to column 104. In addition, notch 104b is configured and shaped in an arcuate configuration that adheres to the natural tilting direction of bracket 108. More specifically, notch 104b can receive protrusion or fastener 108b therein and secured with a nut or bolt, such that fastener 108b can slide within notch 104b and control the movement of bracket 108. In addition, notch 104b can operate as a stop, wherein the closed end 104ba of the notch operates to stop the movement of fastener 108b in one direction, and the other open end top region 104bb can operate to stop the movement of fastener 108b in another opposing direction, thereby controlling the articulating or tilitability of bracket 108. For example, notch 104b may allow bracket 108 to pivot anywhere from zero to 45 degrees relative to a horizontal plane. FIGS. 7E-7F illustrate another embodiment for a monitor pivoting mounting head 109 having an elongated configuration with a larger top surface area. For example, head 109 can allow a larger monitor or display to be mounted onto assembly 100. In addition, head 109 may also have an opening slot 109a therein to allow for an an optional mount or bracket (or display monitor hardware) to be secured thereto and further allow the optional mount or bracket to slide relative to and within slot 109a of head 109.

Figure 7I:
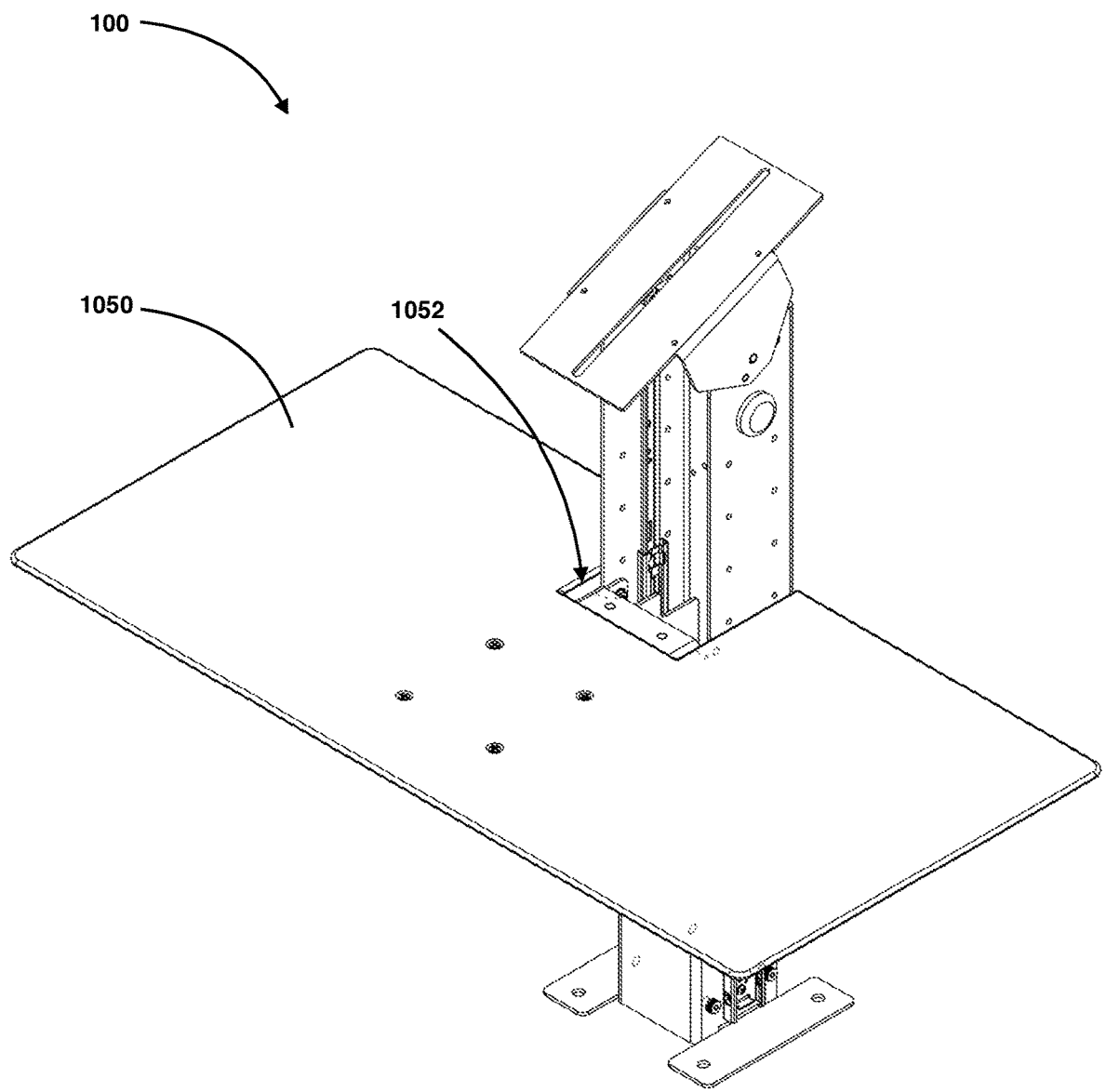
FIG. 7I illustrates a front perspective view of the workstation lift and title assembly of the disclosure described herein shown with a large work surface or peripheral device support plate.
Figure 7J:
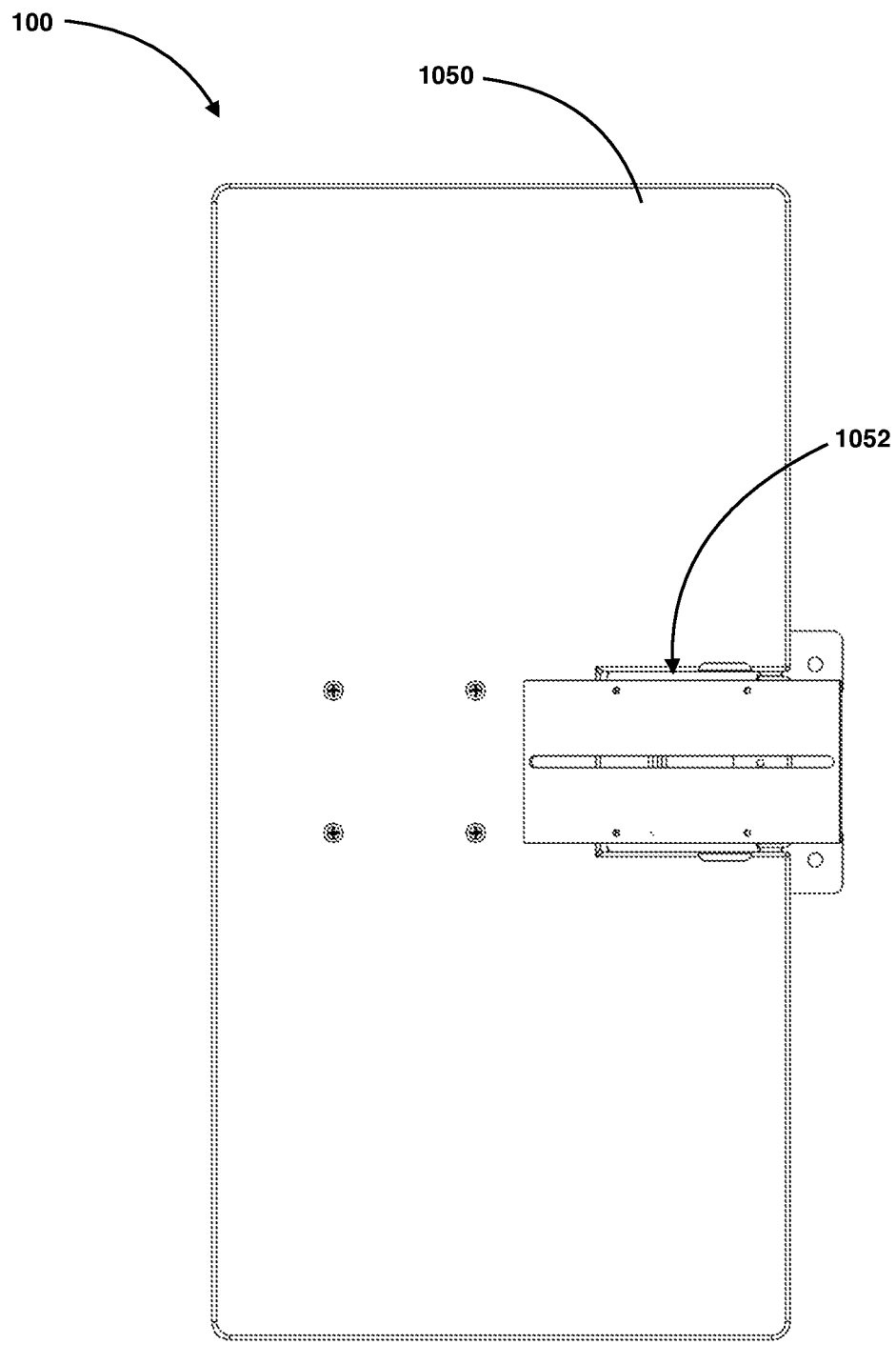
FIG. 7J illustrates a top view of the workstation of FIG. 7I.
Figure 8A:
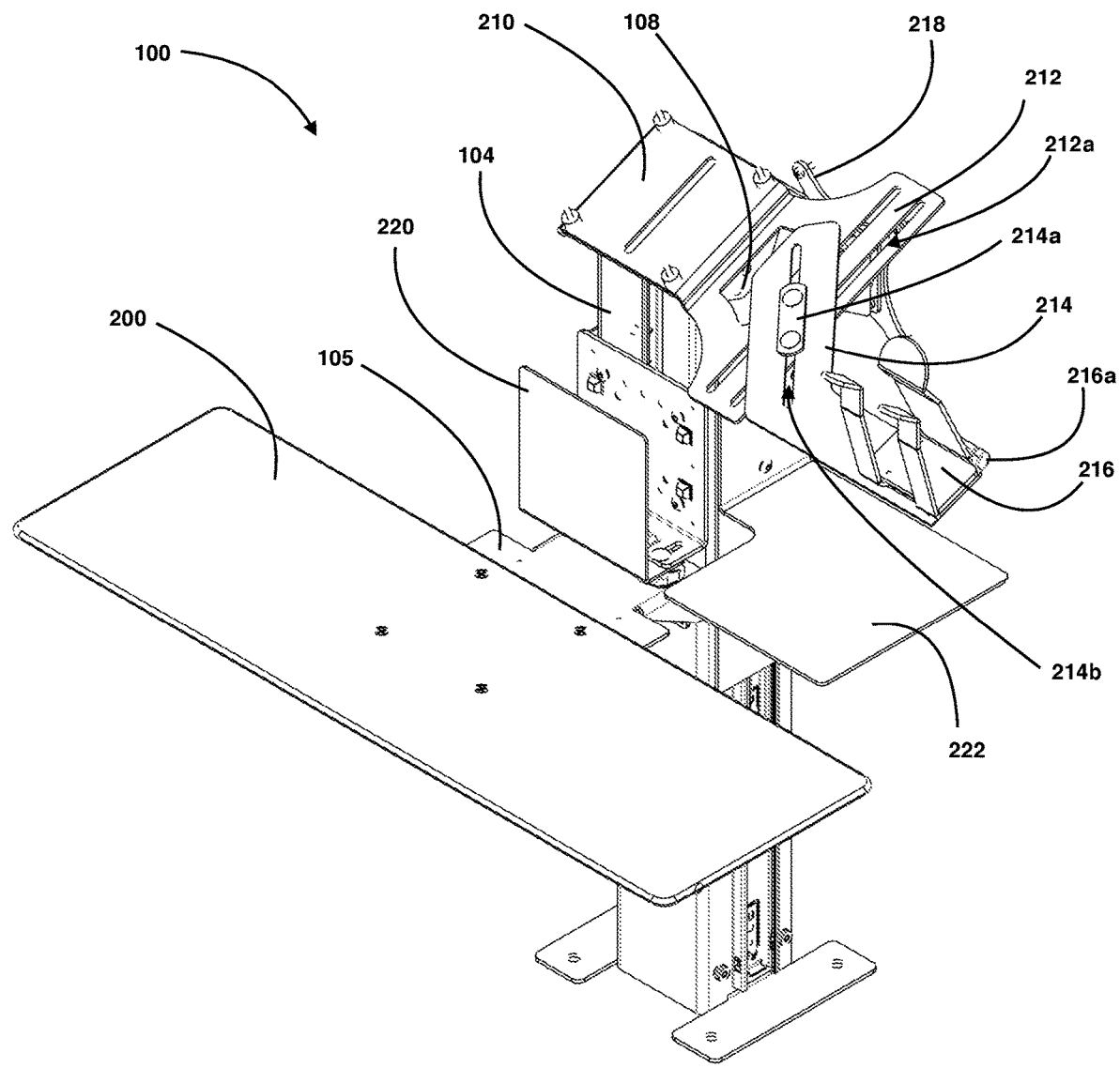
FIG. 8A illustrates a front perspective view of the workstation lift and tilt assembly shown in FIG. 1A in one non-limiting embodiment having a variety of peripheral holding accessories attached thereto.
Figure 8B:
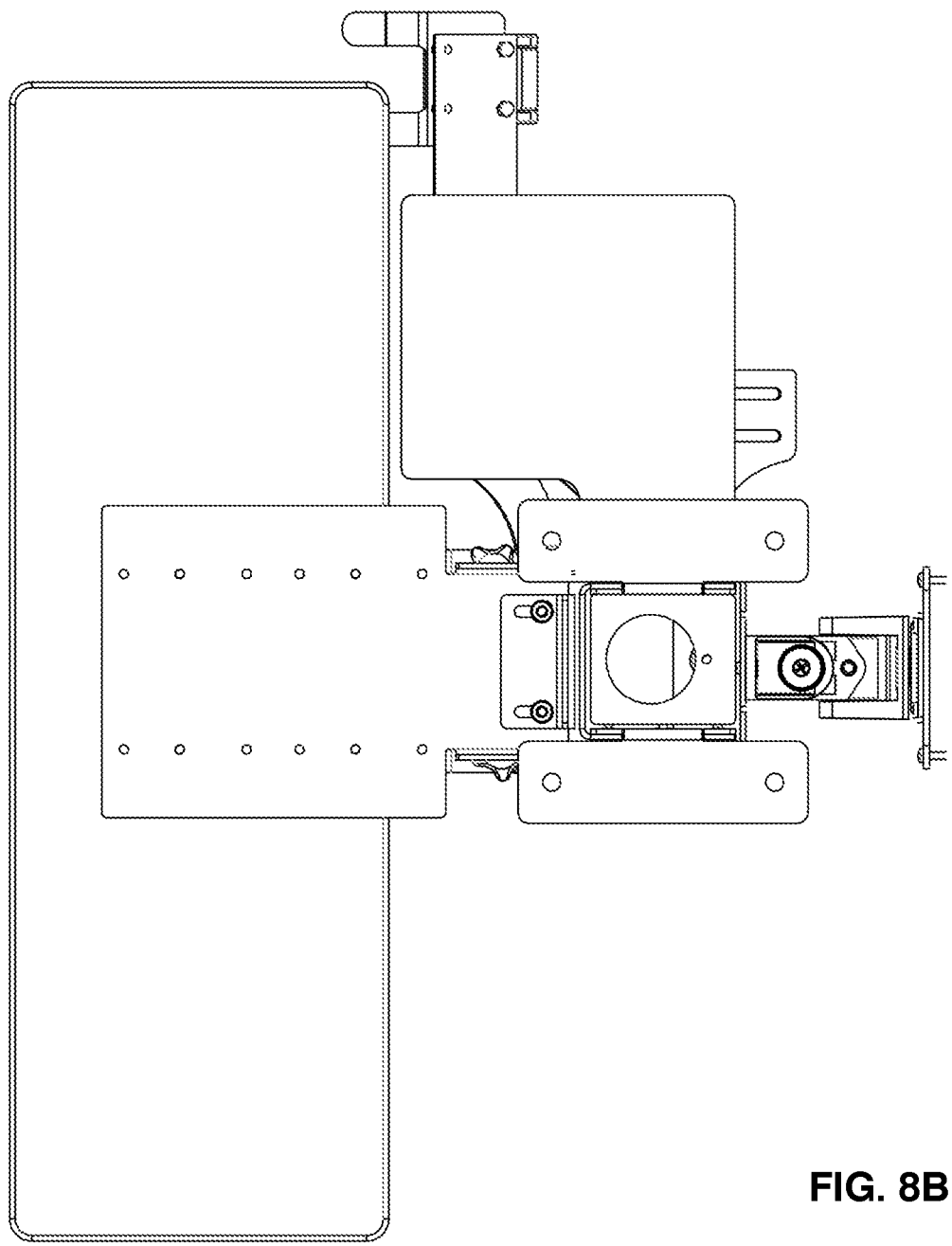
FIG. 8B illustrates a bottom view of the workstation lift and tilt assembly shown in FIG. 8A.
Figure 8C:
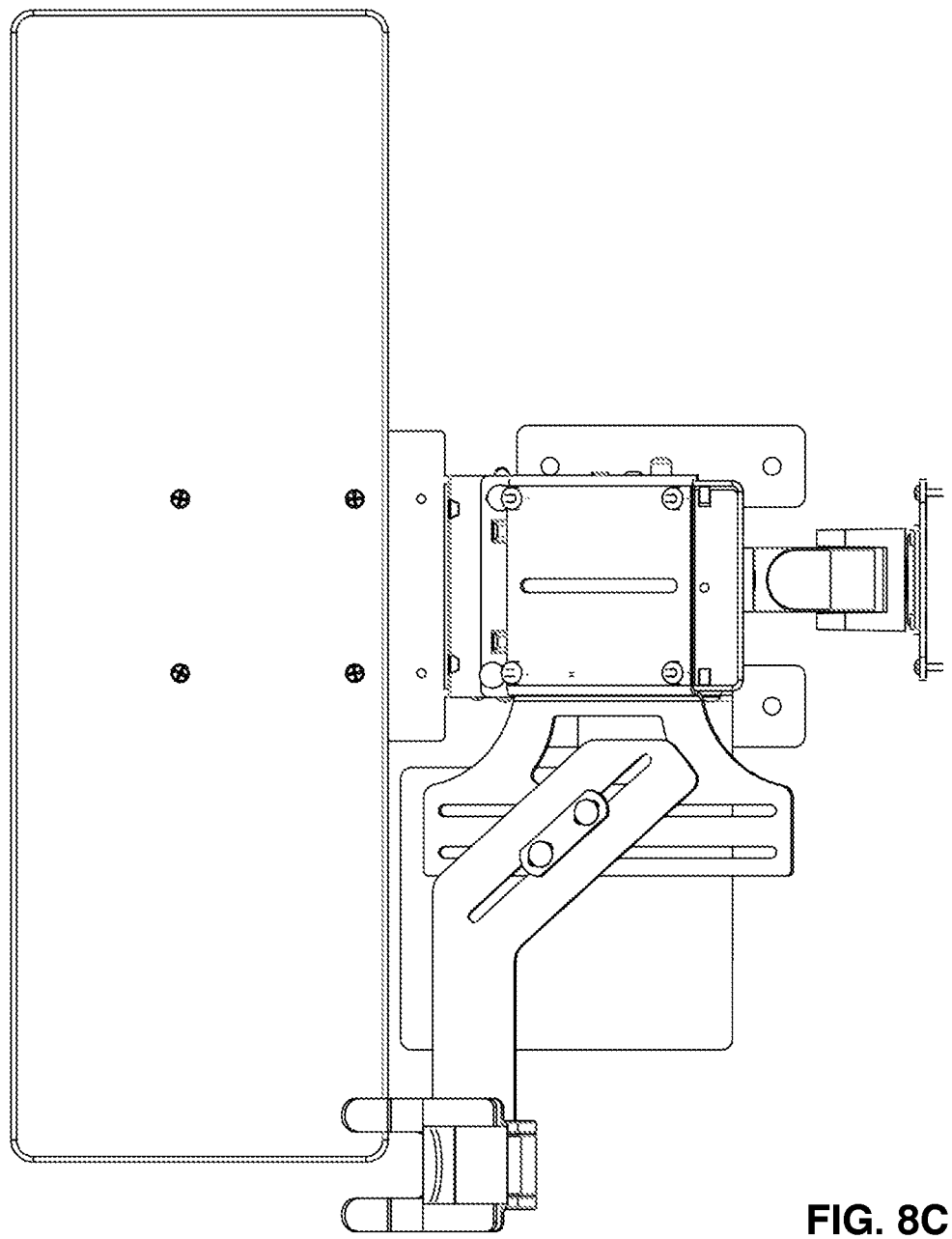
FIG. 8C illustrates a top view of the workstation lift and tilt assembly shown in FIG. 8A.
Figure 8D:
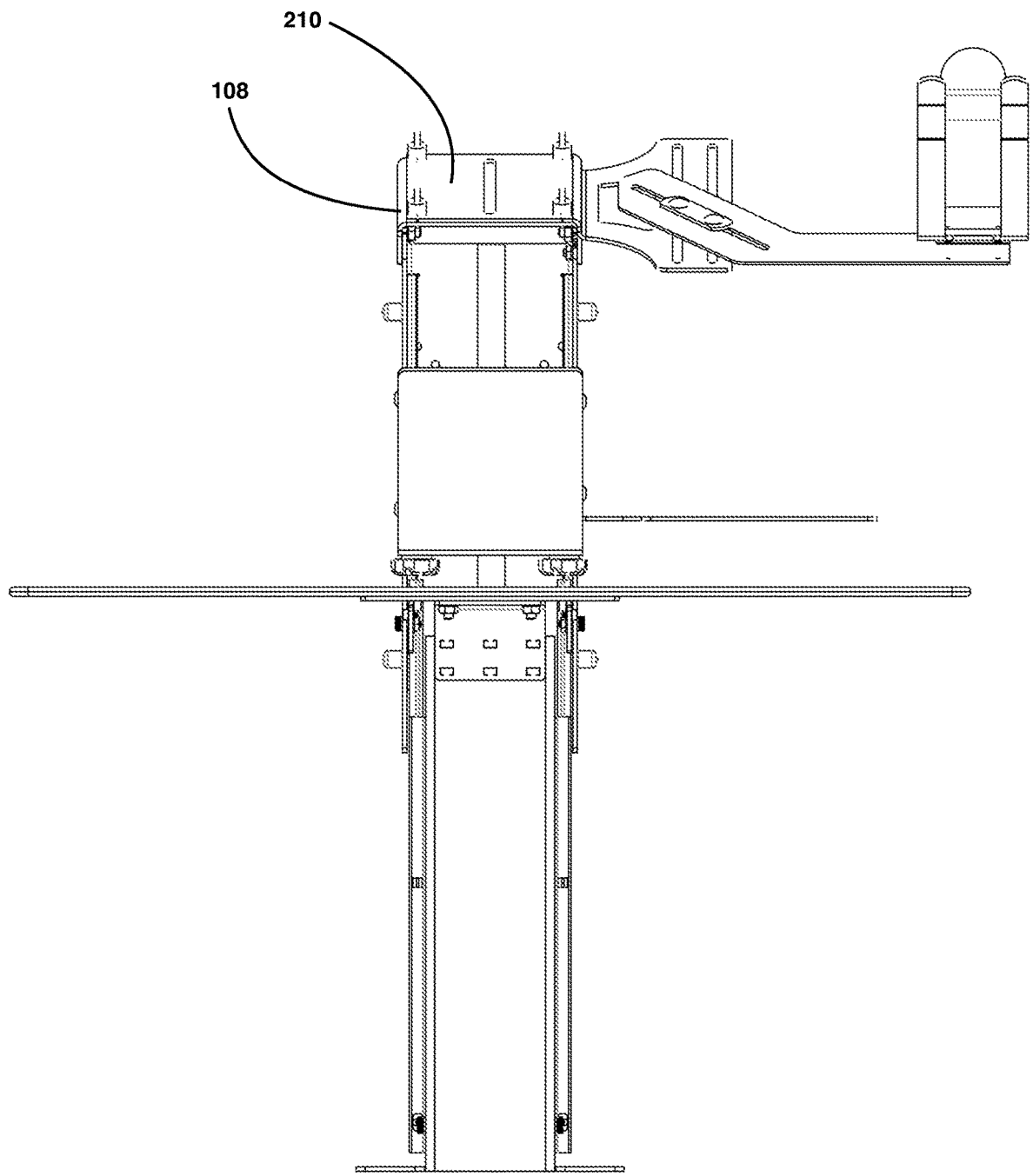
FIG. 8D illustrates a front view of the workstation lift and tilt assembly shown in FIG. 8A.
Figure 8E:
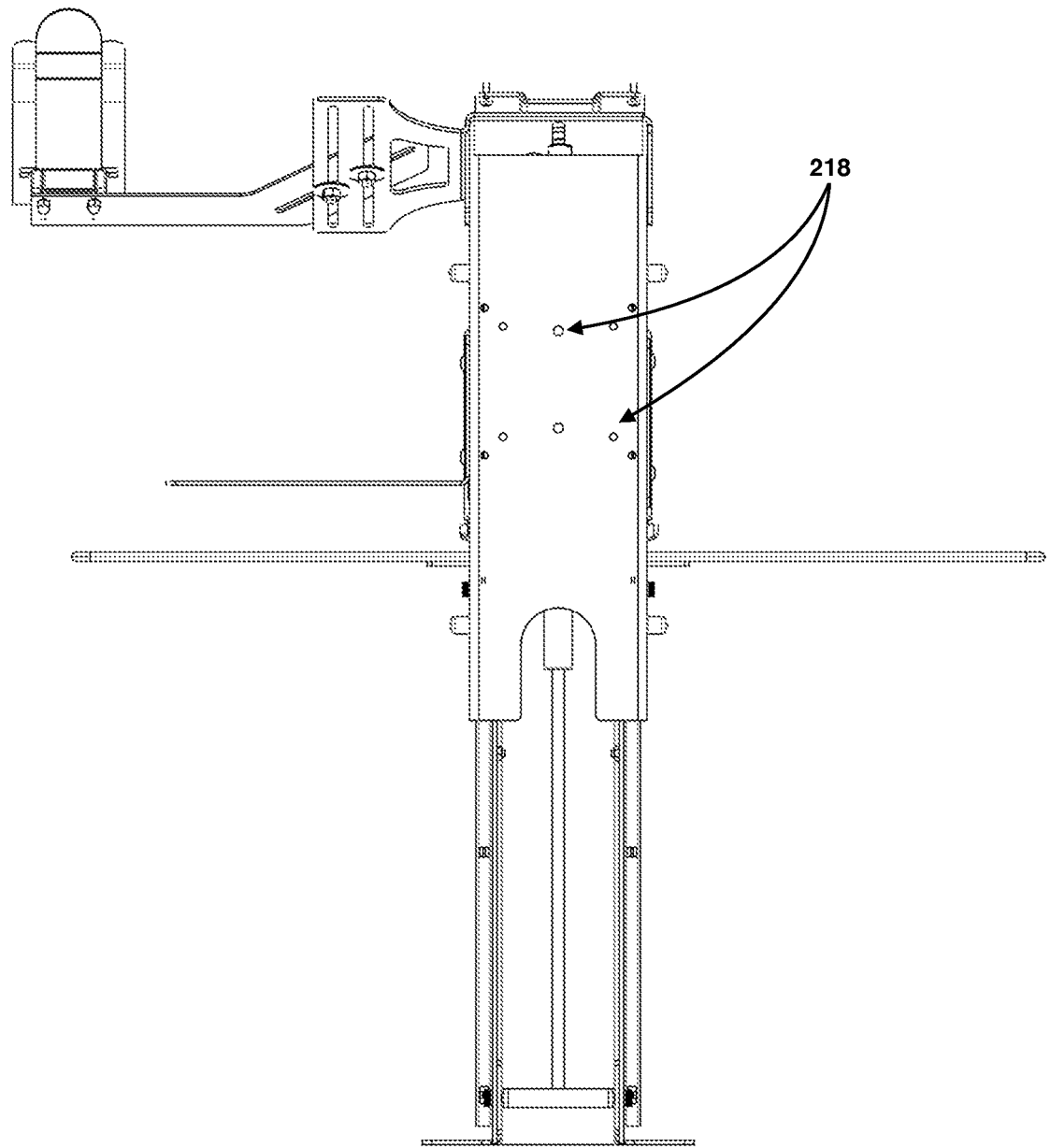
FIG. 8E illustrates a rear view of the workstation lift and tilt assembly shown in FIG. 8A.
Figure 8F:
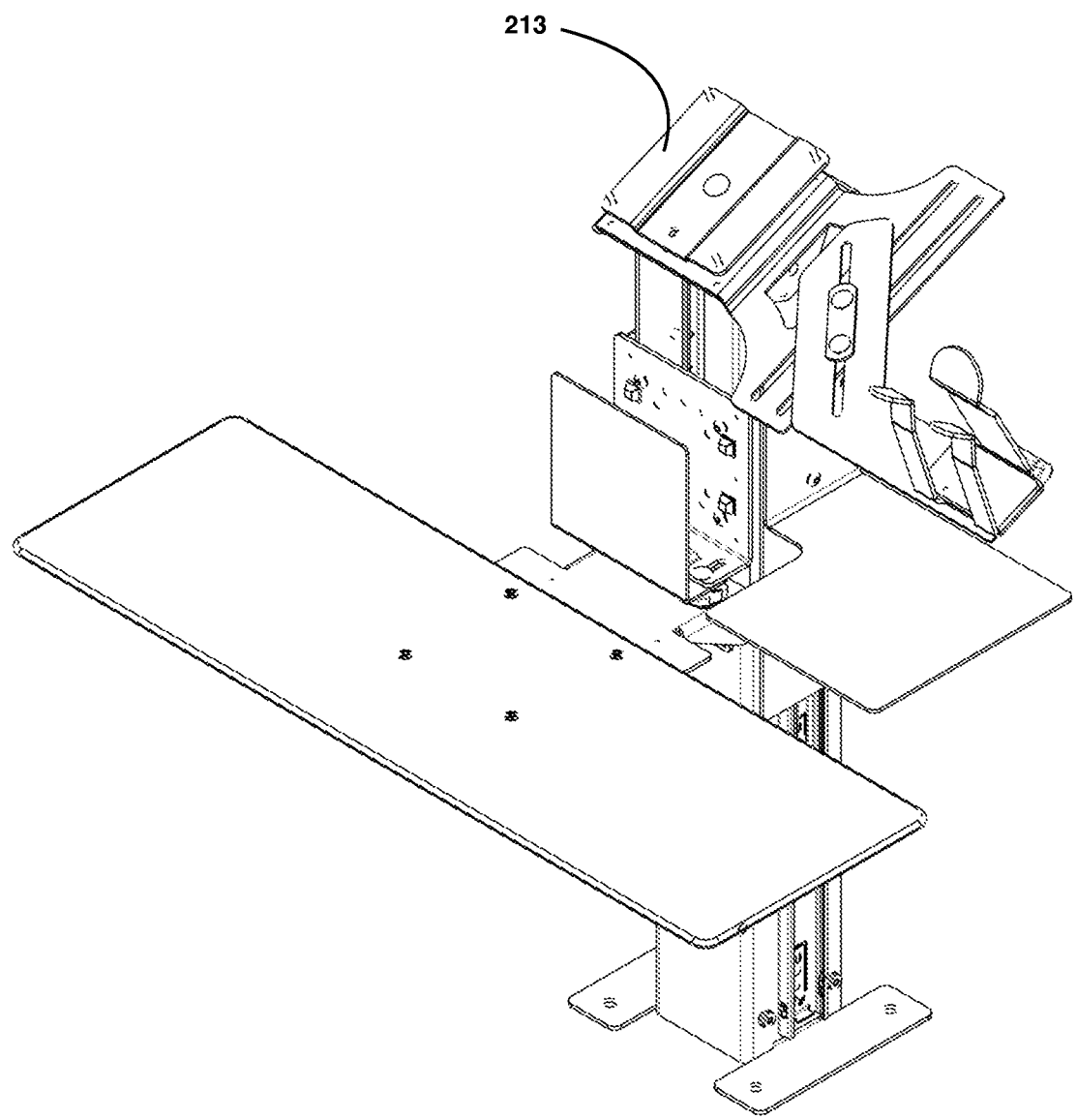
FIG. 8F illustrates a front perspective view of the workstation lift and tilt assembly of FIG. 8A having an additional monitor or display mount or adapter secured thereto.
Figure 9A:
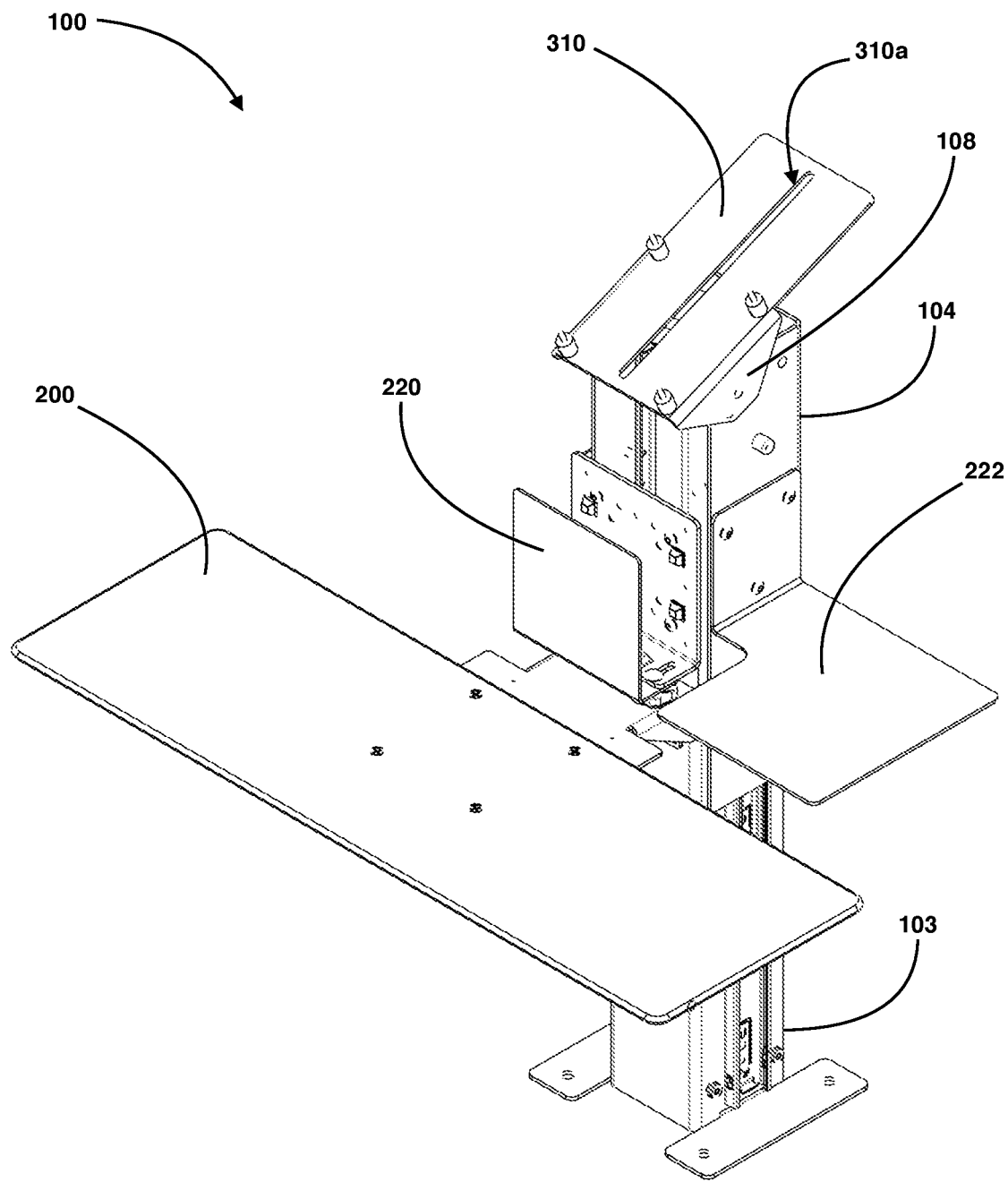
FIG. 9A illustrates a front perspective view of the workstation lift and tilt assembly shown in FIG. 1 in another non-limiting embodiment having a variety of peripheral holding accessories attached thereto.
Figure 9B:
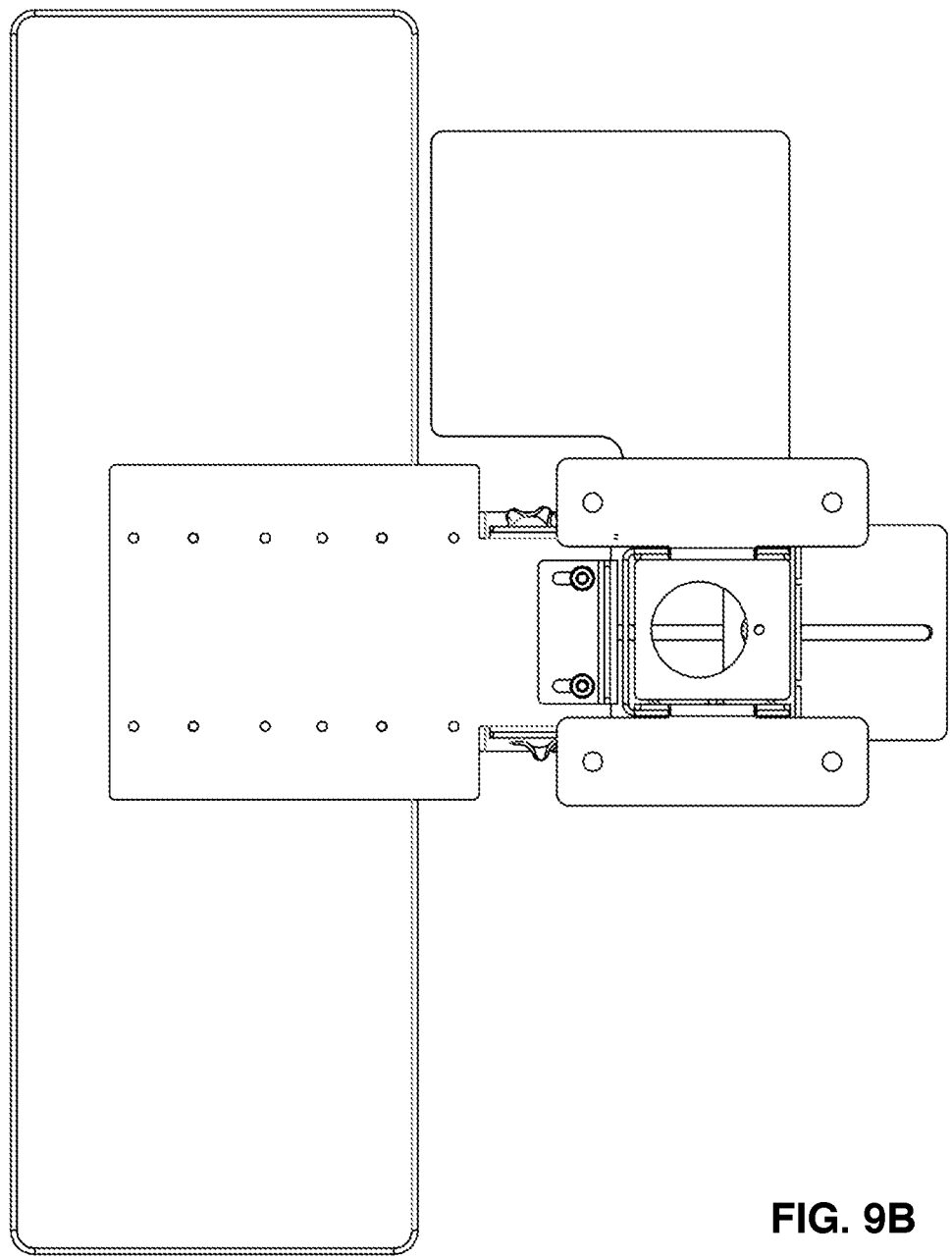
FIG. 9B illustrates a bottom view of the workstation lift and tilt assembly shown in FIG. 9A.
Figure 9C:
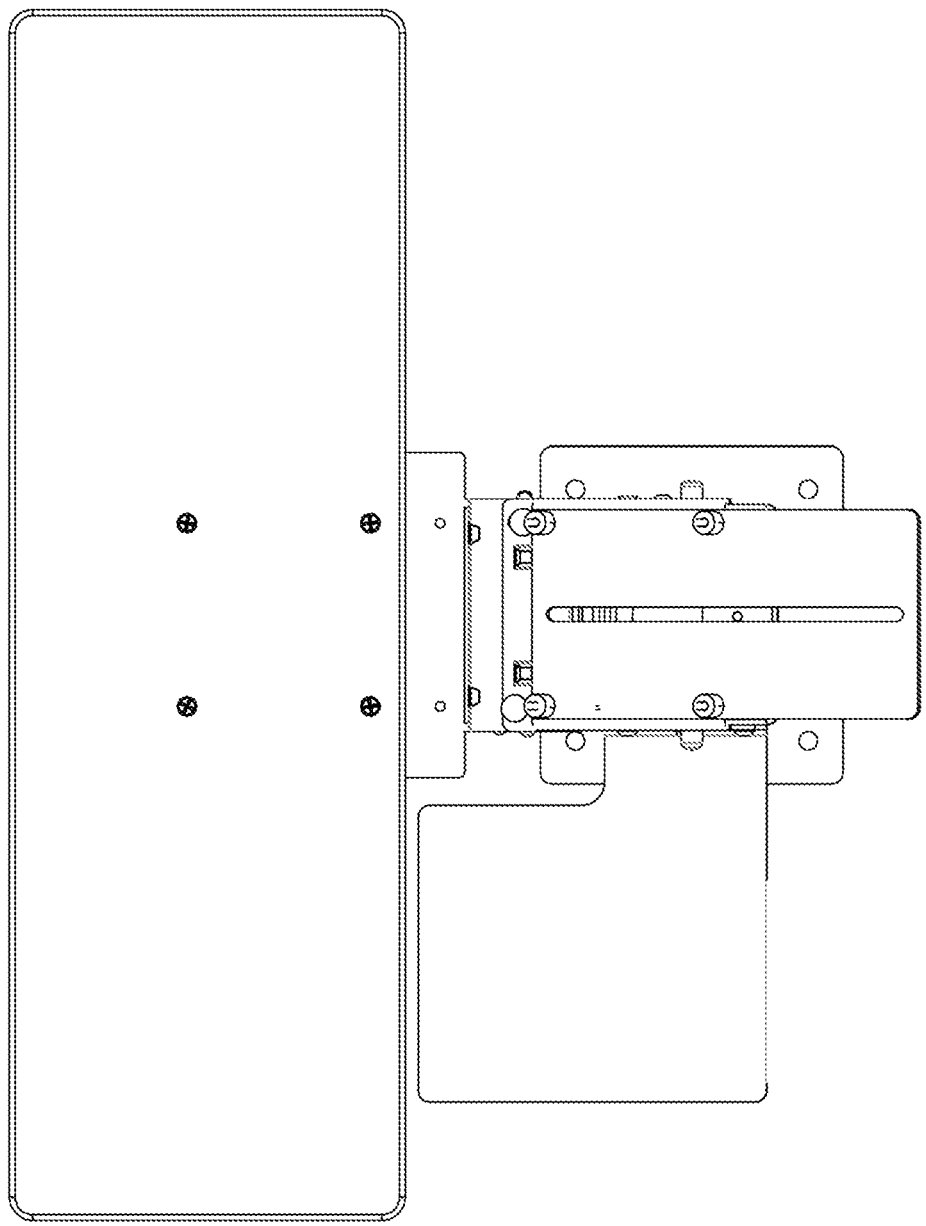
FIG. 9C illustrates a top view of the workstation lift and tilt assembly shown in FIG. 9A.
Figure 9D:
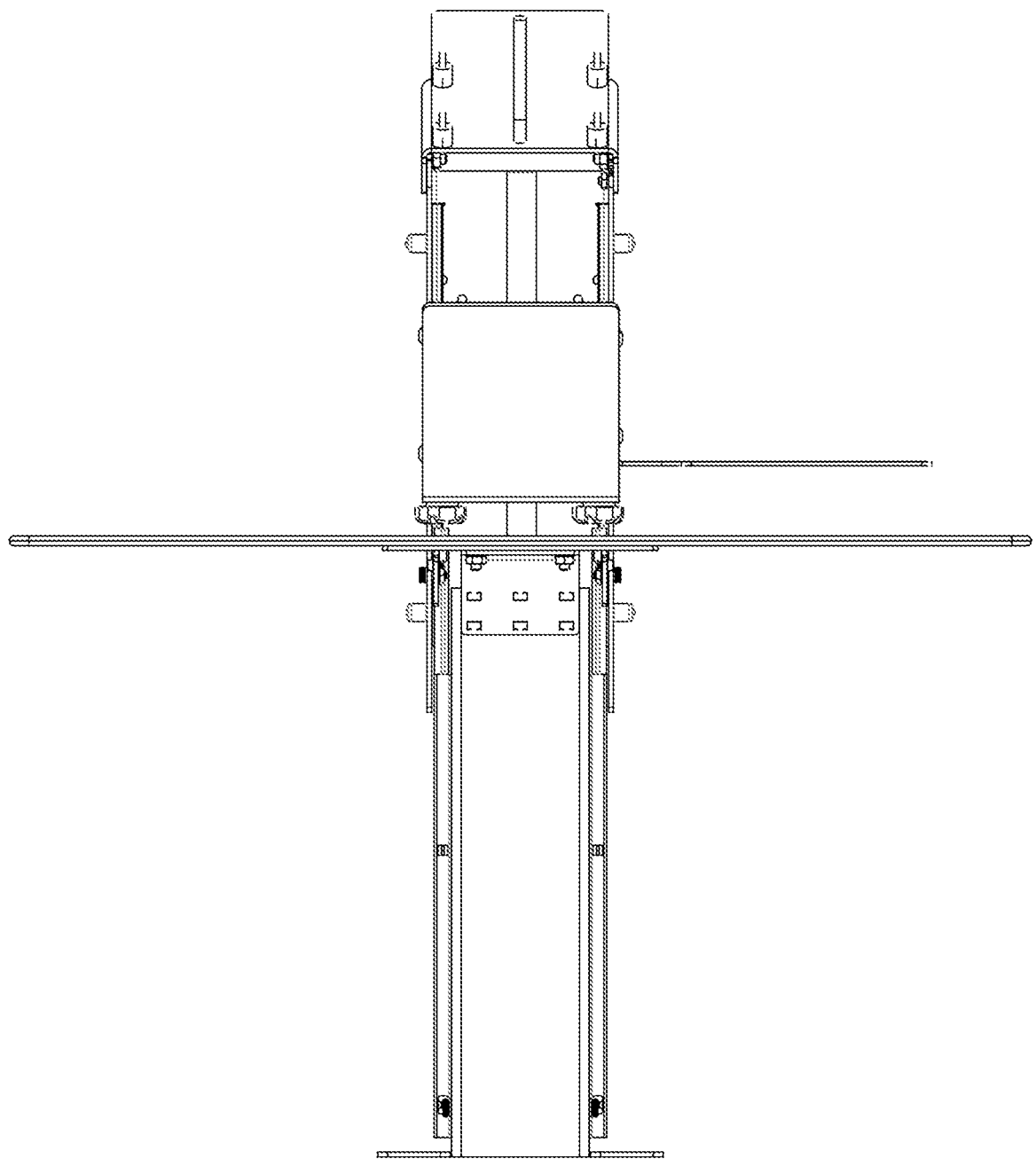
FIG. 9D illustrates a front view of the workstation lift and tilt assembly shown in FIG. 9A.
Figure 9E:
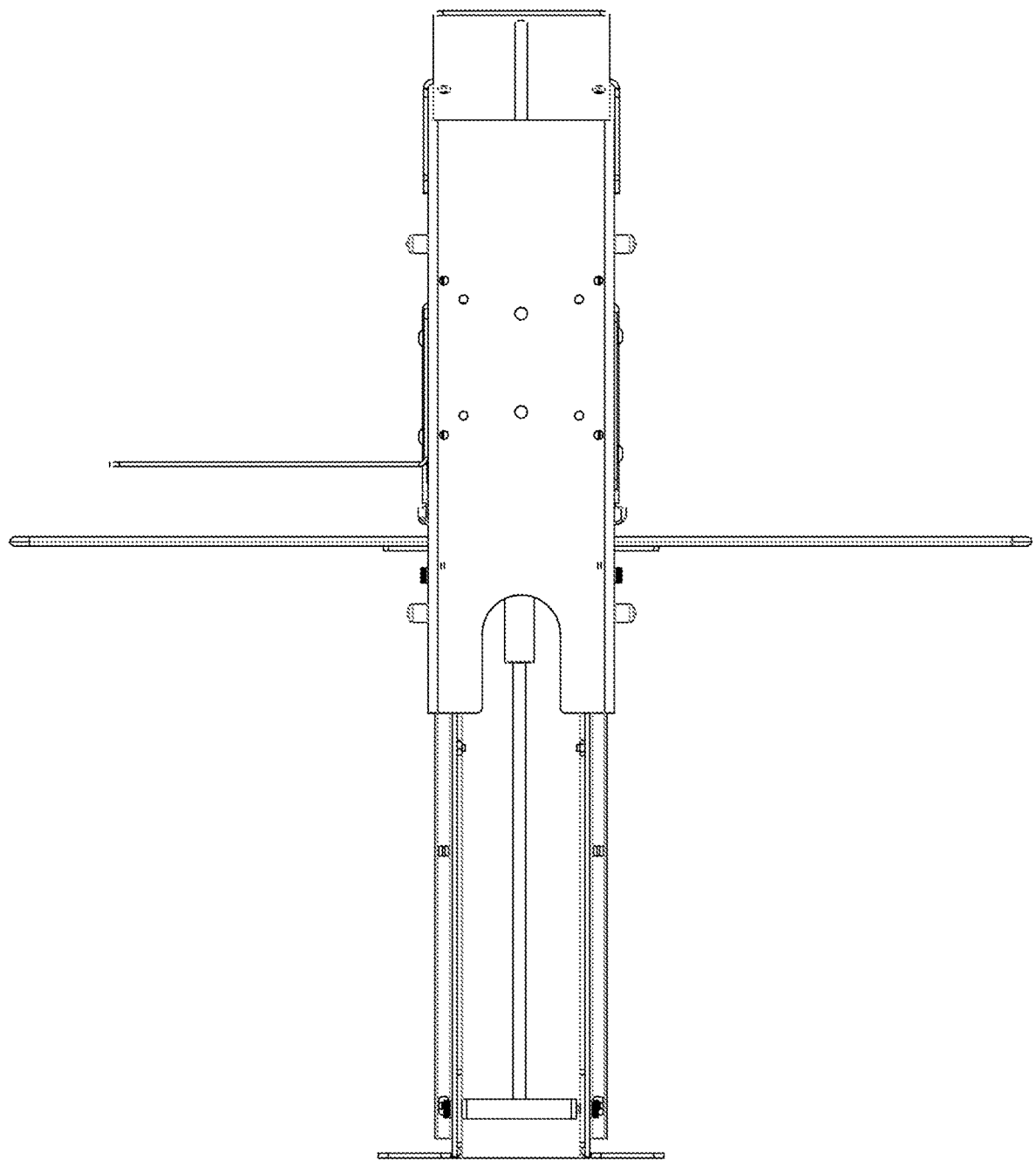
FIG. 9E illustrates a rear view of the workstation lift and tilt assembly shown in FIG. 9A.
Figure 10A:
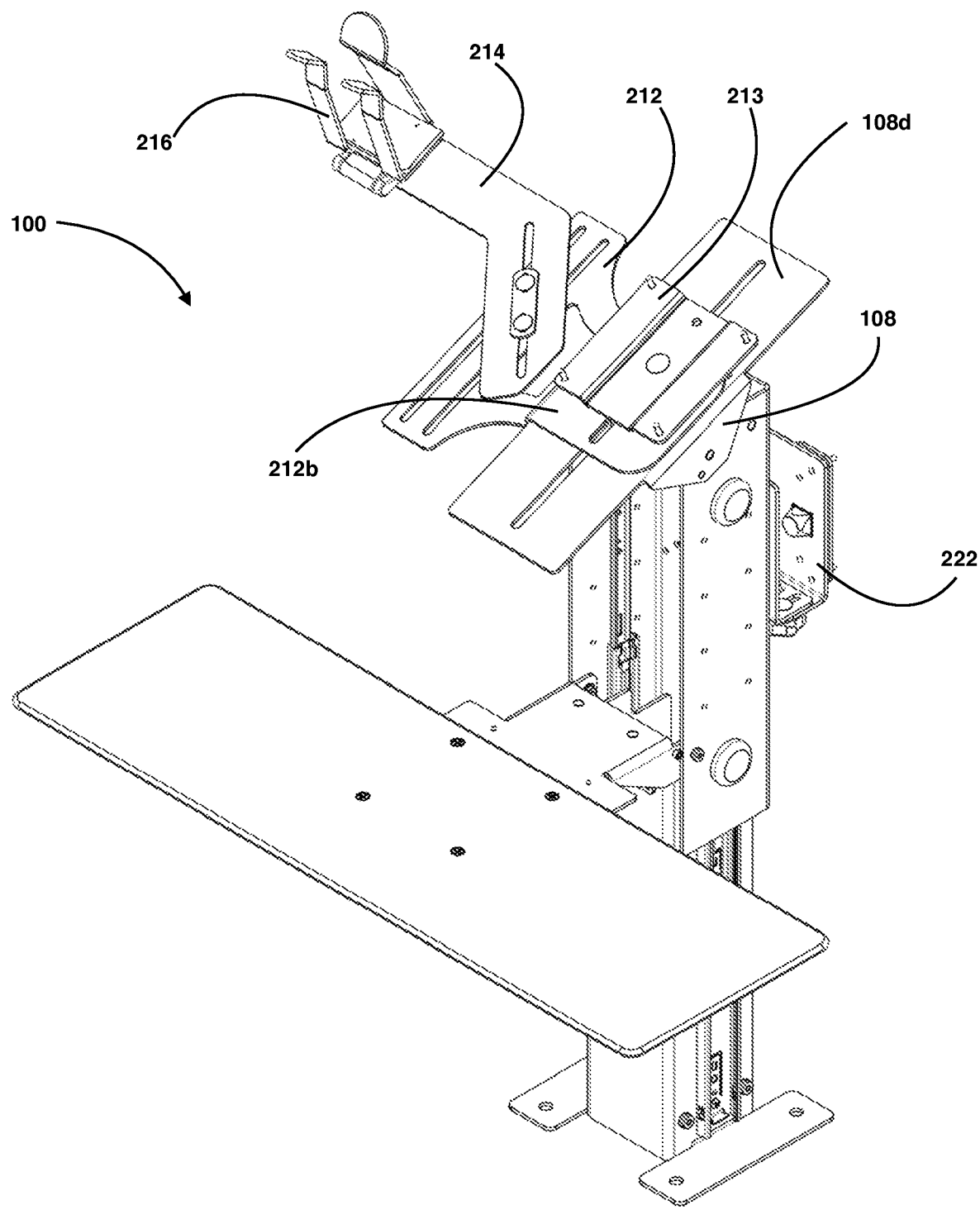
FIG. 10A illustrates a front perspective view of the workstation lift and tilt assembly shown in FIG. 1 in another non-limiting embodiment having a variety of peripheral holding accessories attached thereto.
Figure 10B:
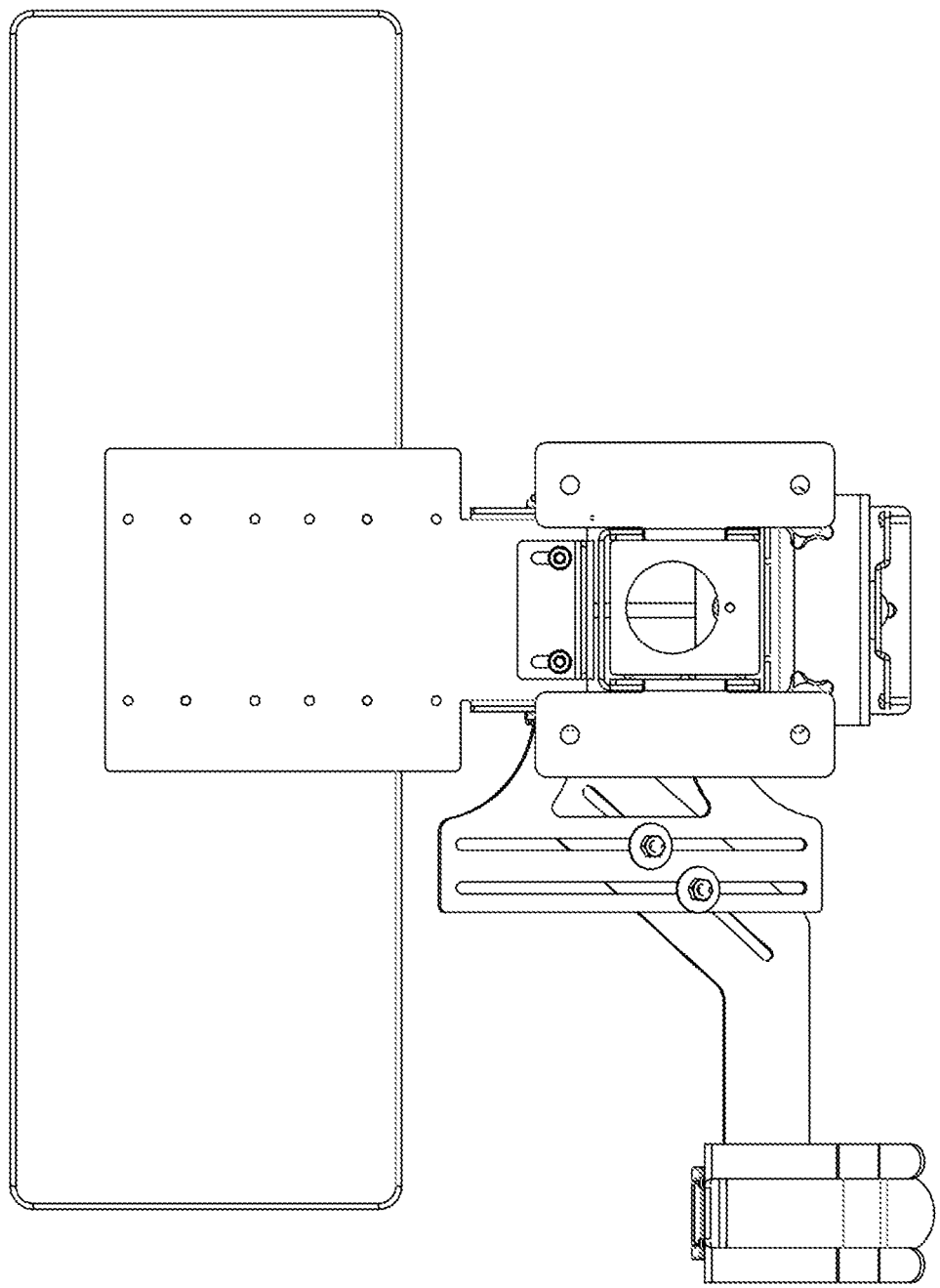
FIG. 10B illustrates a bottom view of the workstation lift and tilt assembly shown in FIG. 10A
Figure 10C:
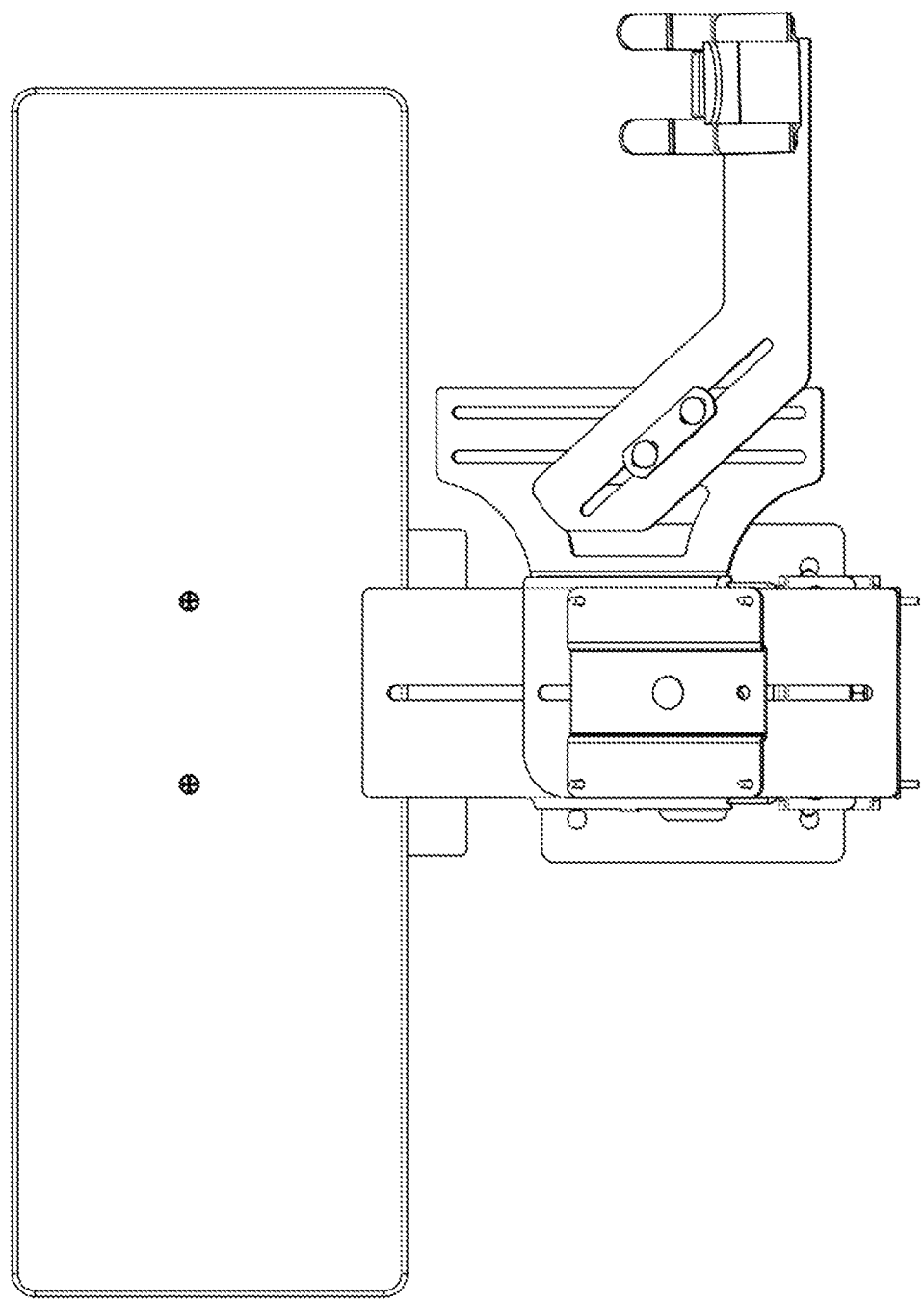
FIG. 10C illustrates a top view of the workstation lift and tilt assembly shown in FIG. 10A.
Figure 10D:
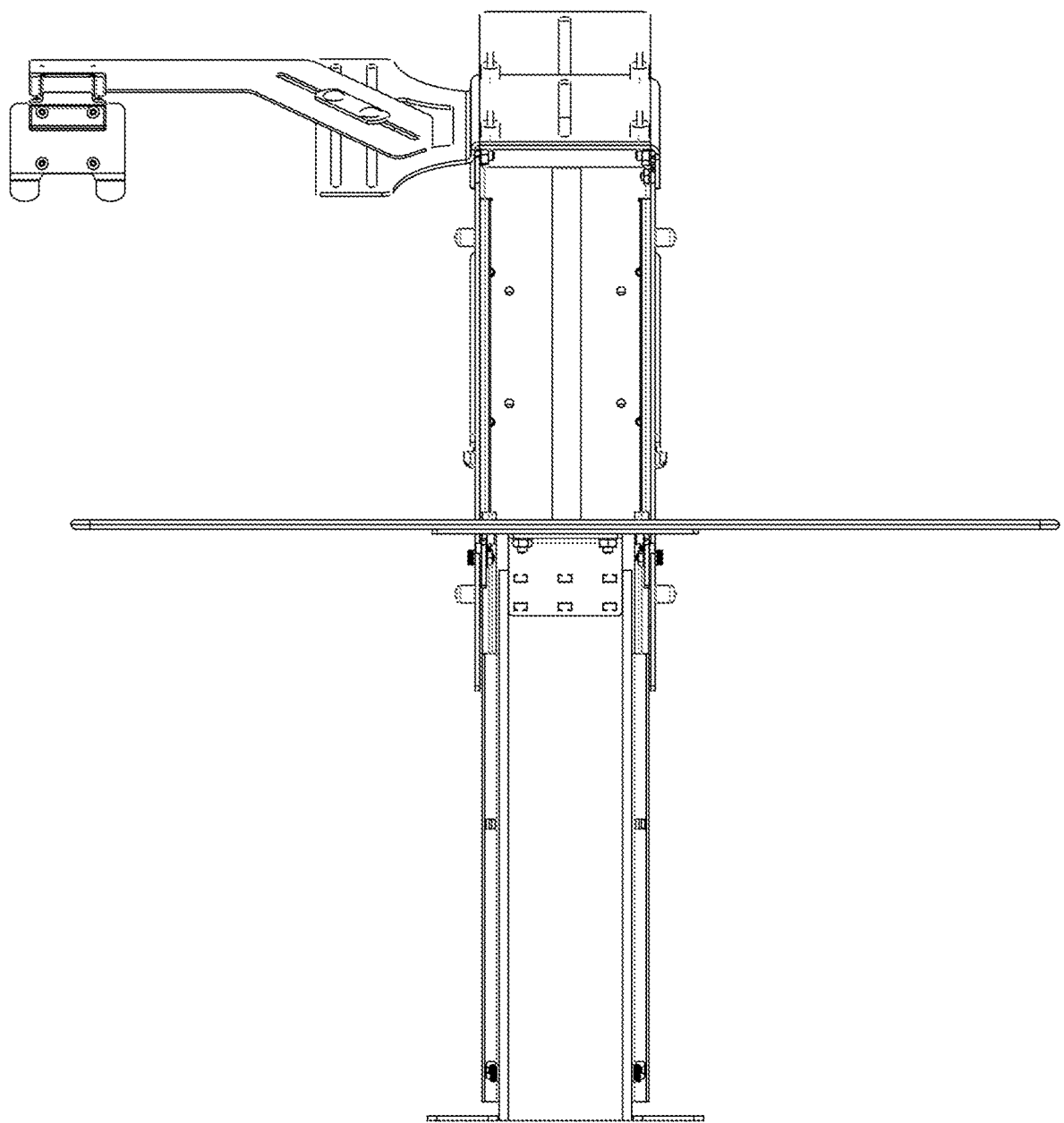
FIG. 10D illustrates a front view of the workstation lift and tilt assembly shown in FIG. 10A
Figure 10E:
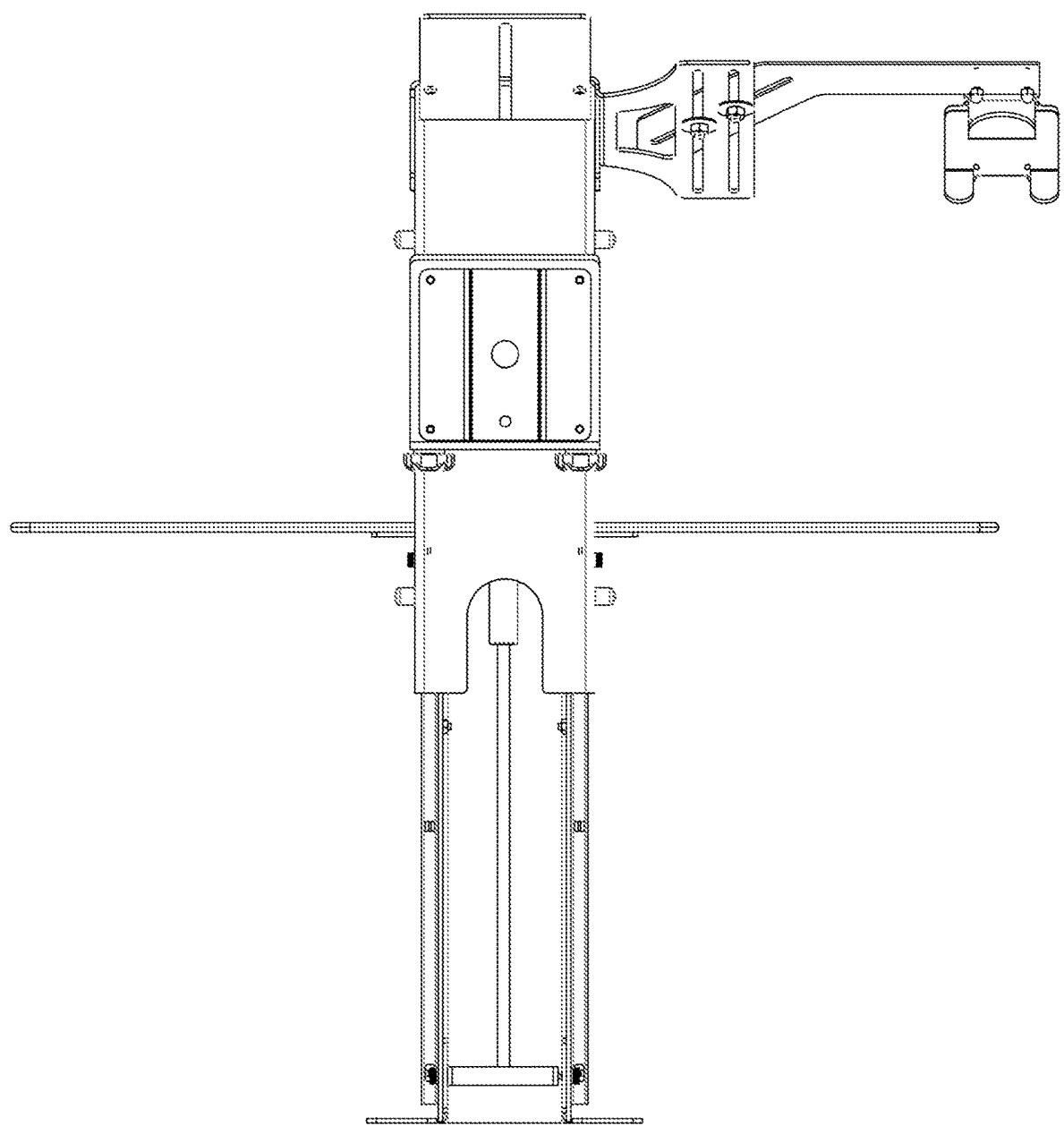
FIG. 10E illustrates a rear view of the workstation lift and tilt assembly shown in FIG. 10A.

FIGS. 7I-7J illustrate a non-limiting embodiment of an alternative embodiment for a support plate 1050 of workstation lift and tilt assembly 100. More specifically, support plate 1050 can include a generally large surface or work area to hold or support multiple items, such as peripherals, keyboards, user input devices, or any other component. Here, support plate 1050 includes a cut-away region 1052 that at least partially wraps-around and receives therein first and second columns of workstation 100.

FIGS. 8A-8E illustrate a non-limiting embodiment of various optional accessories secured to workstation assembly 100. More specifically, a display or monitor mount assembly 210 may be further secured to tilting bracket 108. Here, mount assembly 210 may include a right side assembly 212 having a at least two slots 212a wherein another peripheral device holding assembly 216 may be slidably secured thereto. More specifically, peripheral device assembly holding assembly 216 may include a securable bracket 214 having a bracket 214a with fasteners with corresponding bolts that allows assembly 214 to slide in one axis within slots 212a of assembly 212. In addition, peripheral device holding assembly 216 may also include its own slot 214b that allows assembly 214 to slide along in another separate axis relative to assembly 212. In addition, peripheral holding device 216 may include a hinge 216a that allows it to pivot, articulate, or tilt in any direction. Here, peripheral device assembly 216 generally includes a pair of biasing prongs that can slidably receive a peripheral device within and secured therein.

Still referring to FIGS. 8A-8E, workstation assembly 100 may also include a side tray 222 that can be mounted to a side wall of support column 104. Here, side tray 222 may be configured to hold one or more user input devices, such as a mouse or other touch based input device. In addition, workstation assembly 100 may also include a tray 200 that can be secured to bracket 108 for holding or supporting one or more user input devices, such as a keyboard, mouse, or other touch based input device. In addition, workstation assembly 100 may also include a CPU or computing device holder 220. Here, holder 220 may be further secured to a front exterior region of column 104 via one or more fasteners. Further, workstation assembly 100 may also include an auxiliary display mounting area 218 or mounting points for mounting an additional display or monitor. It is contemplated within the scope of the disclosure described herein that any other optional accessories may be included in addition or in lieu of accessories 200, 210, 212, 214, 216, 218, 220, or 222, among others.

FIGS. 9A-9E illustrate another non-limiting embodiment of various optional accessories secured to workstation assembly 100. More specifically, assembly 100 may also include an elongated display support mount 310 to be pivotally secured to the top region of column 104, using the same protrusion fasteners as shown in mount 108 and guided slots on column 104 as previously disclosed. In particular, display mount 310 may articulate, rotate, tilt, or pivot in any direction or angle, such as from zero up to and including a 45 degree angle relative to a horizontal plane. In addition, the elongated features of mount 310 may allow it to support larger monitor displays. In addition, a slotted opening 310a of mount 310 may allow for various other optional accessories to be mounted thereto. For example, the elongated slot 310a may allow an attached accessory to slide along an axis to any desired height (or increase or decrease focal length or distance from a user relative to the accessory secured thereto) and further provide additional degrees of freedom and configurability. It is contemplated within the scope of the disclosed described herein that any other optional accessories may be included in addition or in lieu of accessories 200, 220, 222, or 310, among others.

FIGS. 10A-10E illustrates another non-limiting embodiment of various optional accessories secured to workstation assembly 100. More specifically, workstation assembly 100 may further include the computing device holder 222 secured to the exterior rear region of column 104. In addition, display mount bracket 108 may also feature an elongated plate 108d, wherein plate 108d may further have one or more optional accessories or a display monitor slidably secured thereto. For example, an additional monitor mount or VESA mount 213 may be secured to elongated plate 108d. Here, assembly 100 may also include side brackets and assemblies 212, 214, and 216 secured to the left side region of workstation assembly 100. More specifically, a securement portion 212b of the side brackets may be secured onto elongated plate 108d of plate 108 and monitor mount 213 further secured on to portion 212b and plate 108d of plate 108. It is contemplated within the scope of the disclosed described herein that any other optional accessories may be included in addition or in lieu of accessories 200, 220, 222, or 310, among others.

Figure 11A:
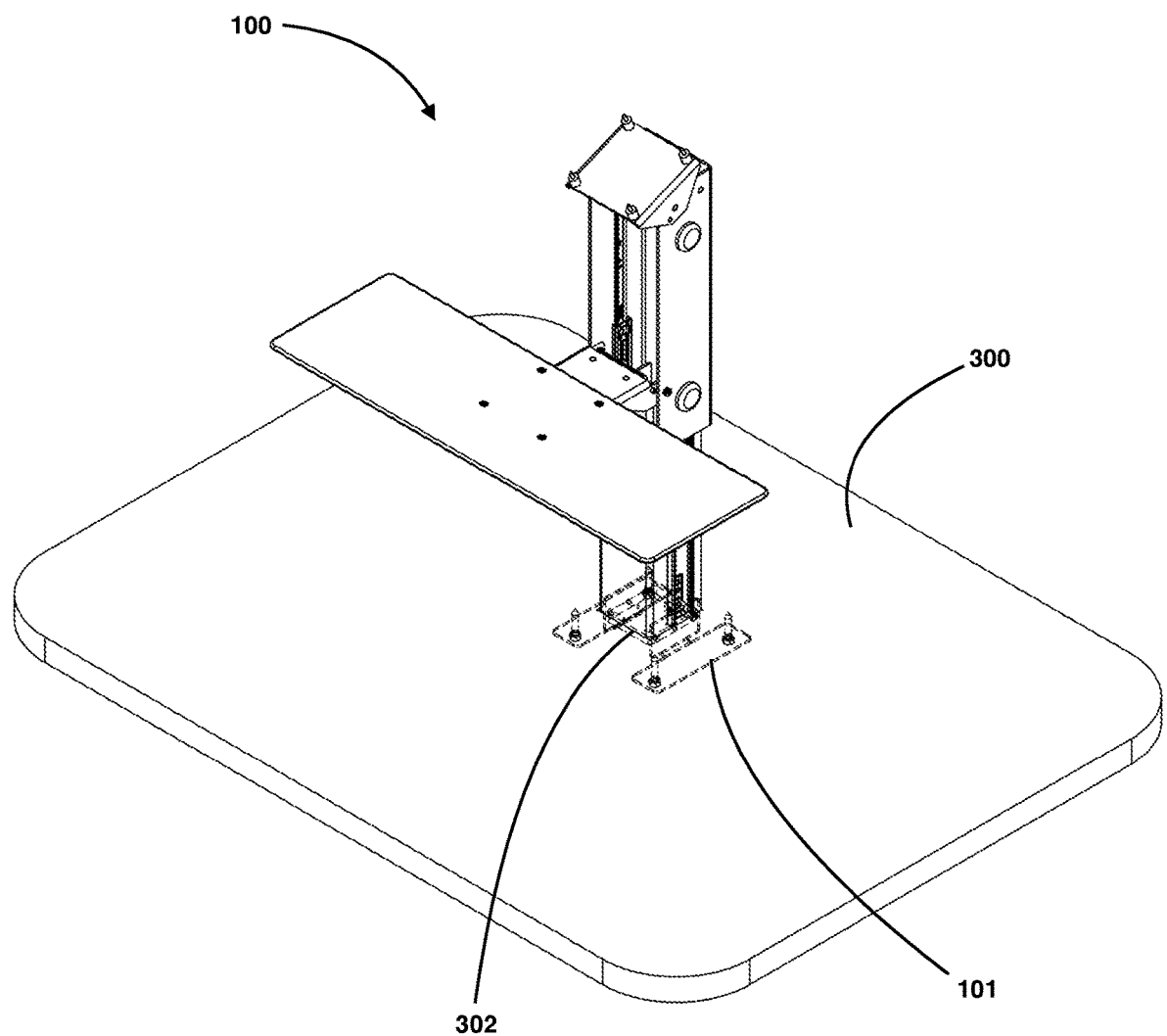
FIG. 11A illustrates a perspective view of the workstation lift and tilt assembly in one non-limiting embodiment illustrating the base secured to a table from underneath the table.
Figure 11B:
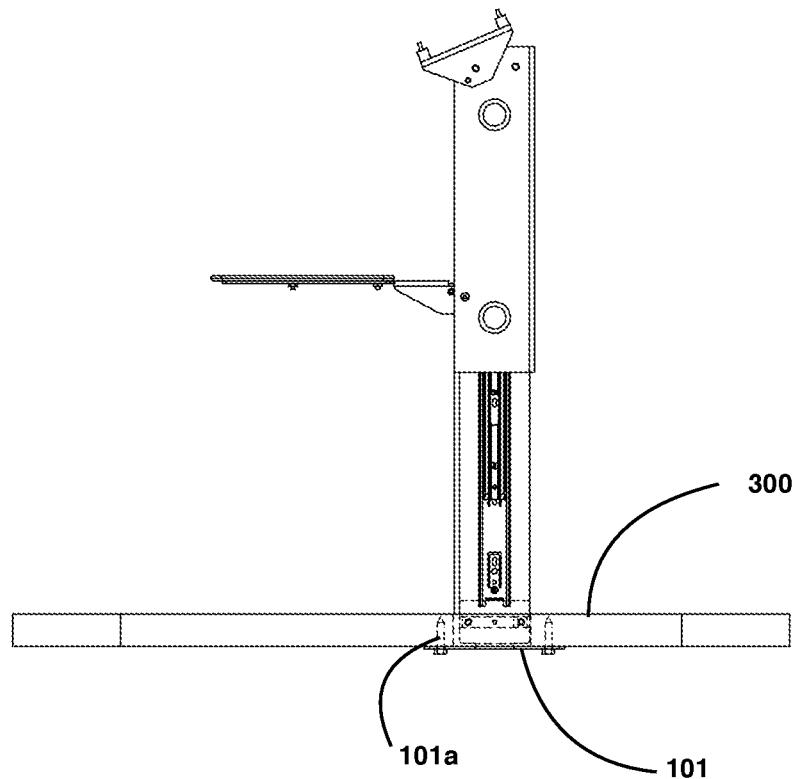
FIG. 11B illustrates a side view of the workstation lift and tilt assem shown in FIG. 11A.
Figure 11C:
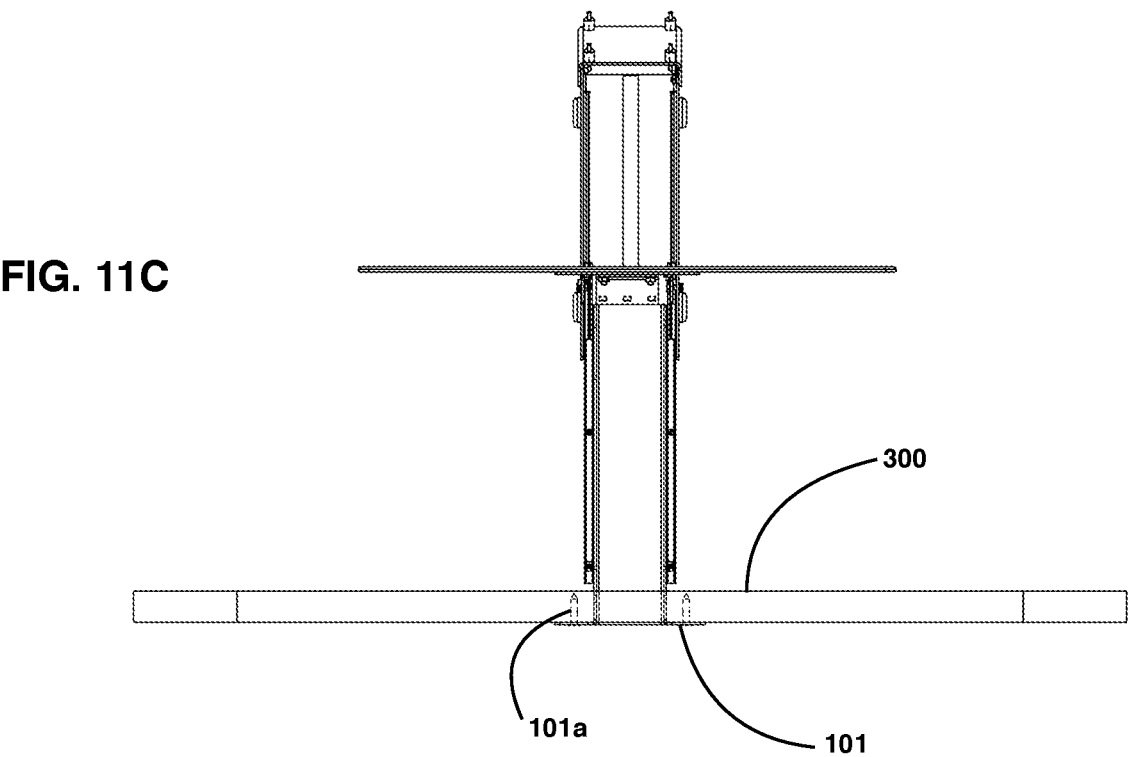
FIG. 11C illustrates a front view of the workstation lift and tilt assembly shown in FIG. 11A.
Figure 12A:
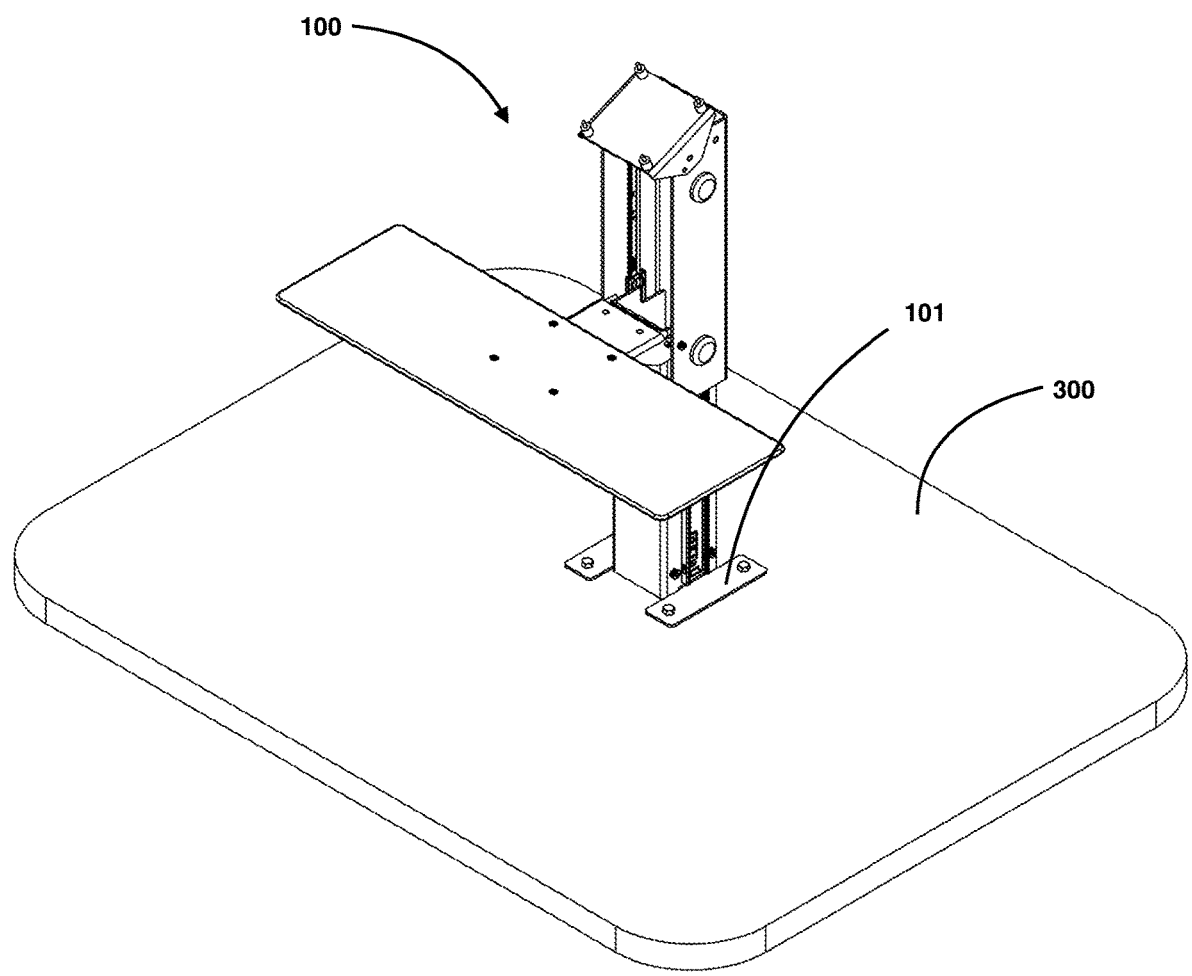
FIG. 12A illustrates a perspective view of the workstation lift and tilt assembly in one non-limiting embodiment illustrating the base secured to a table from the top of the table.
Figure 12B:
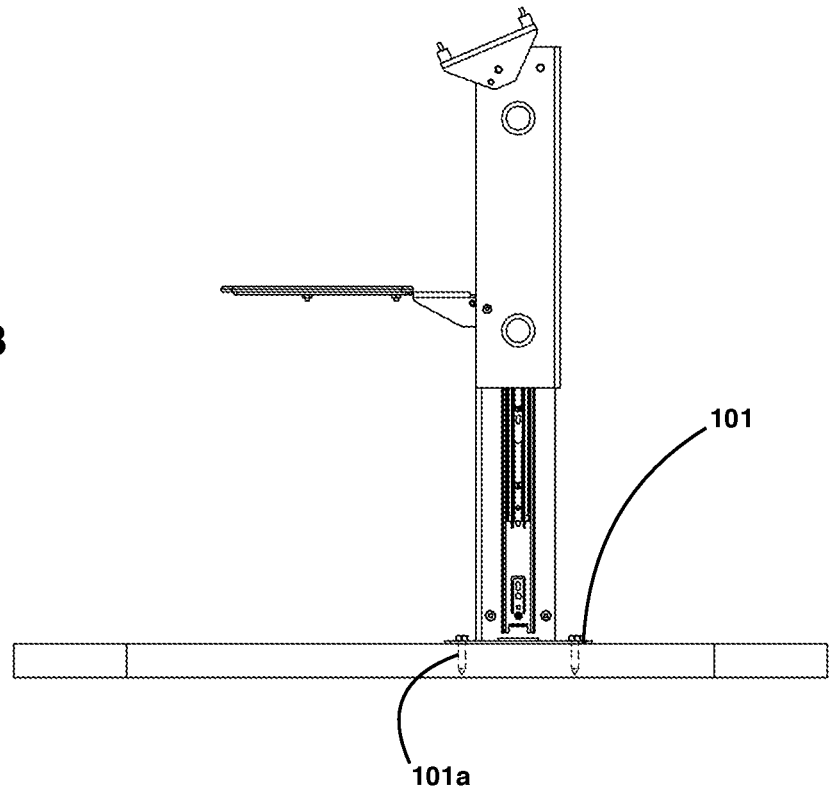
FIG. 12B illustrates a side view of the workstation lift and tilt assem shown in FIG. 12A.
Figure 12C:
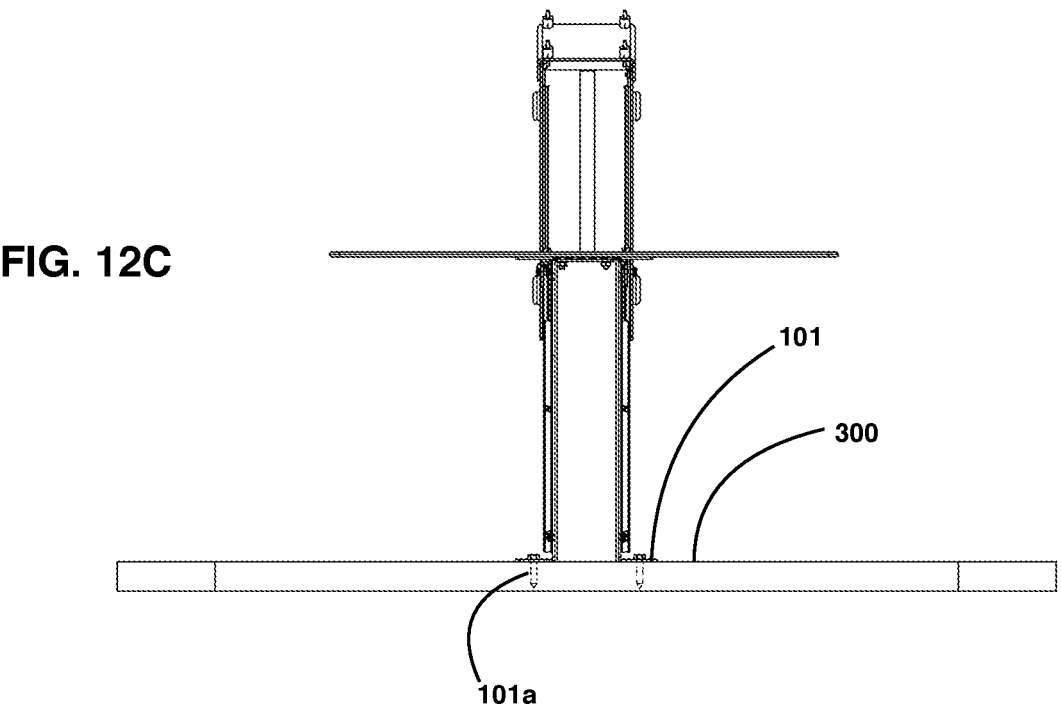
FIG. 12C illustrates a front view of the workstation lift and tilt assembly shown in FIG. 12A.

FIGS. 11A-11C illustrate one non-limiting embodiment of securing workstation assembly 100 to a table, floor, or any support or work surface 300 from under that surface. More specifically, as shown in FIGS. 11A-11C, table or support surface 300 can include a cut-out or opening 302 such that a portion of lower column 103 can be placed therethrough and mounts 101 secured to the surface 300 from underneath surface 300 via one or more fasteners 101. FIGS. 12A-12C illustrate another non-limiting embodiment of securing workstation assembly 100 to a table, floor, or any support or work surface 300 from under that surface. More specifically, as shown in FIGS. 12A-12C, mounts 101 of assembly 100 can be secured to the top of surface 300 via one or more fasteners 101a.

Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the disclosure described herein is not limited to the specific forms or arrangement of parts or method of assembly described herein, except insofar as such limitations are included in the following claims. Further, it will be understood that certain features and sub-combinations are of utility and may be employed without reference to other features and sub-combinations.

The invention claimed is:

1. A computer workstation assembly, comprising:
   a base;
   a first column, wherein the first column is secured to the base;
   a second column;
   a mount, wherein the mount is secured to a top region of the second column and configured to pivot relative to the second column, and wherein the top region of the second column further comprises a first slot and a second slot, wherein the second slot is below the first slot;
   a first main slide having a first sub slide;
   a second main slide having a second sub slide;
   wherein the first main slide is secured to one side of the first column and the second main slide is secured to an opposing side of the first column;

wherein the first sub slide is secured to one side of the second column and the second sub slide is secured to an opposing side of the second column; and wherein the second column is adapted slide relative to the first column.

2. The computer workstation assembly of claim 1, wherein the second slot comprises an arcuate configuration.

3. The computer workstation assembly of claim 2, wherein the second slot receives a fastener or protrusion therein, and wherein the fastener or protrusion slide within the arcuate configuration of the second slot.

4. The computer workstation assembly of claim 1, wherein the top region of the second column further comprises a third slot, wherein the third slot is on an opposing side of the first slot or second slot.

5. The computer workstation assembly of claim 1, further comprising an elongated biasing mechanism.

6. The computer workstation assembly of claim 5, wherein the elongated biasing mechanism is comprised of a gas spring cylinder.

7. The computer workstation assembly of claim 5, wherein one end of the biasing mechanism is secured to a first plate near the top region of the second column and another end of the biasing mechanism is secured to a second plate near the base.

8. The computer workstation assembly of claim 1, further comprising a support plate secured to the second column, wherein the support plate is configured to pivot relative to the first or second column.

9. The computer workstation assembly of claim 8, further comprising a stop member, wherein the stop member is secured to the support plate.

10. The computer workstation assembly of claim 9, wherein the stop member is configured to engage the first column, thereby preventing movement of the second column relative to the first column.

11. A computer workstation assembly, comprising:
a first column;
a second column;
a peripheral support plate secured to the second column;
a flange having a stop member secured to the peripheral support plate, wherein the stop member is configured to engage to or disengage from a front exterior region of the first column;
an adapter, wherein the adapter is secured to a distal region of the second column and configured to pivot relative to the second column;
a first slide receiver having a first extendable slide;
a second slide receiver having a second extendable slide;

wherein the first slide receiver is secured to one side of the first column and the second slide receiver is secured to an opposing side of the first column;

wherein the first extendable slide is secured to one side of the second column and the second extendable slide is secured to an opposing side of the second column; and wherein the second column is adapted slide relative to the first column.

12. The computer workstation assembly of claim 11, wherein the stop member is comprised of a rubberized pad.

13. The computer workstation assembly of claim 11, wherein the adapter comprises at least one protruding member that is received within a channel or groove of the second column.

14. The computer workstation assembly of claim 11, further comprising a device holder comprised of a pair of biasing prongs.

15. The computer workstation assembly of claim 11, wherein the peripheral support plate comprises a cut-away region, wherein the cut-away region receives the first and second columns there.

16. A computer workstation assembly, comprising:
a first column;
a second column, wherein the second column receives the first column therein;
an adapter having an elongated slot therein, wherein the adapter is secured to a top region of the second column and configured to pivot relative to the second column; and
a support plate secured to the second column, wherein the support plate is configured to pivot relative to the first or second column, and wherein the support plate further comprises a stop member.

17. The computer workstation assembly of claim 16, wherein the stop member is configured to engage to or disengage from a front exterior region of the first column.

18. The computer workstation assembly of claim 16, wherein the adapter comprises at least one protruding member that is received within a channel or groove of second column.

19. The computer workstation assembly of claim 16, further comprising an elongated biasing mechanism.

20. The computer workstation assembly of claim 19, wherein one end of the biasing mechanism is secure to a first plate near the top region of the second column and another end of the biasing mechanism is secured to second plate near the base of the workstation assembly.

* * * * *